US012724116B2

(12) United States Patent
Shalita et al.

(10) Patent No.: US 12,724,116 B2
(45) Date of Patent: Sep. 1, 2026

(54) APPARATUS, SYSTEM, AND METHOD OF SCHEDULING RADAR TRANSMISSIONS

(71) Applicant: Intel Corporation, Santa Clara, CA (US)

(72) Inventors: Oren Shalita, Tel-Aviv (IL); Moshe Teplitsky, Tel-Aviv (IL); Sharon Heruti, Tel-Aviv (IL); Alon Cohen, Modi'in-Maccabim-Reut (IL); Ophir Shabtay, Tsofit (IL); Ilia Yoffe, Ashdod (IL); Roy Sofer, Binyamina (IL); Merav Sicron, Kfar-Saba (IL)

(73) Assignee: INTEL CORPORATION, Santa Clara, CA (US)

( * ) Notice: Subject to any disclaimer, the term of this patent is extended or adjusted under 35 U.S.C. 154(b) by 294 days.

(21) Appl. No.: 18/574,713

(22) PCT Filed: Jun. 29, 2022

(86) PCT No.: PCT/US2022/035470
§ 371 (c)(1),
(2) Date: Dec. 27, 2023

(87) PCT Pub. No.: WO2023/048793
PCT Pub. Date: Mar. 30, 2023

(65) Prior Publication Data

US 2024/0319332 A1 Sep. 26, 2024

Related U.S. Application Data

(60) Provisional application No. 63/247,562, filed on Sep. 23, 2021.

(51) Int. Cl.
*G01S 7/40* (2006.01)
*G01S 7/35* (2006.01)
(Continued)

(52) U.S. Cl.
CPC ............ *G01S 7/4008* (2013.01); *G01S 7/356* (2021.05); *G01S 13/584* (2013.01); *G01S 13/931* (2013.01)

(58) Field of Classification Search
CPC ...... G01S 13/931; G01S 13/584; G01S 13/89; G01S 13/0209; G01S 7/356; G01S 7/023
(Continued)

(56) References Cited

U.S. PATENT DOCUMENTS 3,918,054 A * 11/1975 Collins .................. G01S 13/28 342/192
5,128,683 A * 7/1992 Freedman ................ H01Q 3/26 342/158

(Continued)

FOREIGN PATENT DOCUMENTS

| | | |
|---|---|---|
| EP | 3 832 350 | 6/2021 |
| KR | 10-1760614 | 7/2017 |
| WO | 2020/180911 A1 | 9/2020 |

OTHER PUBLICATIONS

Search Report for European Patent Application No. 22873346.5, mailed on Jun. 5, 2025, 18 pages.

(Continued)

*Primary Examiner* — Michael W Justice
(74) *Attorney, Agent, or Firm* — Shichrur & Co.

(57) ABSTRACT

For example, an apparatus may include a scheduler configured to determine scheduling information to schedule radar transmissions of a radar device during a sequence of radar frames. For example, the scheduler may be configured to determine a burst-based frame setting to schedule a sequence of radar burst transmissions during a radar frame of the sequence of radar frames. In one example, the burst-based frame setting may include a setting of a burst gap duration. In one example, the burst gap duration may (Continued)

1711 1713
High-Power
1712 1712
Low Power
0 0.05 0.1 0.15 0.2 0.25 0.3 0.35 0.4 0.45 0.5
time(ms)

1700 include a duration of a burst gap between first and second consecutive radar burst transmissions of the sequence of radar burst transmissions.

20 Claims, 19 Drawing Sheets

(51) Int. Cl.
*G01S 13/58* (2006.01)
*G01S 13/931* (2020.01)

(58) Field of Classification Search
USPC .................................. 342/70, 107, 195, 196
See application file for complete search history.

(56) References Cited

U.S. PATENT DOCUMENTS 5,668,738 A * 9/1997 Ataras, III ......... H04Q 11/0457 709/204
6,018,803 A * 1/2000 Kardach ............... G06F 1/3215 714/39
8,599,062 B2 * 12/2013 Szajnowski ........... G01S 13/345 342/104
8,872,674 B1 * 10/2014 Subramanya ........... G01S 13/00 340/939
8,878,697 B2 * 11/2014 Subramanya ............. G01S 7/40 340/435
9,264,692 B2 * 2/2016 Andersson ............ G06T 15/405
9,415,721 B2 * 8/2016 Subramanya ............. G01S 7/40
9,964,636 B1 * 5/2018 Subramanya ........... G01S 13/02
10,114,116 B2 * 10/2018 Lilburn ................... G01S 7/282
10,120,069 B2 * 11/2018 Lilburn ................... G01S 13/28
10,124,726 B2 * 11/2018 Subramanya ............. G01S 7/40
10,969,466 B2 * 4/2021 Longman .............. G01S 13/584
11,137,488 B1 * 10/2021 Braun ..................... G01S 7/282
11,187,783 B2 * 11/2021 Doescher .............. G01S 7/0232
11,209,534 B2 * 12/2021 Leabman ............... A61B 5/021
11,385,344 B2 * 7/2022 Peng ..................... G01S 13/536
11,420,556 B2 * 8/2022 Subramanya ............ G07C 1/30
11,550,029 B2 * 1/2023 Kumar ...................... G01S 7/10
11,609,318 B2 * 3/2023 Ertem ..................... G01S 13/10
11,740,345 B2 * 8/2023 Narayana Moorthy ..................... G01S 13/343 342/112
11,789,137 B2 * 10/2023 Subburaj ................. H03L 7/197 342/128
11,994,578 B2 * 5/2024 Hong .................... G01S 13/584
2011/0122014 A1 * 5/2011 Szajnowski ............. G01S 7/023 342/109
2013/0099943 A1 * 4/2013 Subramanya ......... G01S 13/931 340/933
2015/0009049 A1 * 1/2015 Subramanya .......... B60Q 9/002 342/135
2016/0054437 A1 * 2/2016 Lilburn ..................... G01S 7/28 342/21
2017/0129400 A1 * 5/2017 Subramanya ......... G01S 7/2927
2017/0139036 A1 * 5/2017 Nayyar ................ G01S 13/343
2018/0074182 A1 * 3/2018 Lilburn ................... G01S 13/28
2018/0231636 A1 * 8/2018 Maher ..................... G01S 7/352
2020/0057136 A1 * 2/2020 Doescher .............. G01S 13/584
2020/0148106 A1 * 5/2020 Subramanya ........... G01S 13/91
2020/0150222 A1 * 5/2020 Longman .............. G01S 13/584
2020/0191932 A1 * 6/2020 Leabman .............. G01S 13/106
2020/0191944 A1 * 6/2020 Leabman ................ G01S 13/88
2020/0191945 A1 * 6/2020 Leabman ................ G01S 7/282
2020/0284874 A1 * 9/2020 Narayana Moorthy ..................... G01S 13/343
2021/0018588 A1 * 1/2021 Akamine ................ G01S 7/411
2021/0063555 A1 * 3/2021 Ertem ..................... G01S 13/10
2021/0286064 A1 * 9/2021 Braun ................... G01S 13/872
2021/0293948 A1 * 9/2021 Peng ..................... G01S 13/345
2022/0018931 A1 * 1/2022 Kumar ...................... G01S 7/10
2022/0099820 A1 * 3/2022 Hong ...................... G01S 7/354
2022/0206133 A1 * 6/2022 Subburaj .............. H03C 3/0941
2023/0311758 A1 * 10/2023 Subramanya ........... G01S 7/003 340/933
2024/0375584 A1 * 11/2024 Subramanya ......... G01S 7/2926

OTHER PUBLICATIONS

International Preliminary Report on Patentability for International Application No. PCT/US2022/035470, mailed on Apr. 4, 2024, 7 pages.

International Search Report and the Written Opinion for International Application No. PCT/US2022/035470, mailed on Oct. 26, 2022, 11 pages.

Bo Li et al., 'Radar Burst Control Based on Constrained Ordinal Optimization Under Guidance Quality Constraints', International Conference on Communications and Networking in China, ChinaCom 2017: Communications and Networking, pp. 61-71, Mar. 27, 2018.

Ernesto Rodriguez, 'On the Optimal Design of Doppler Scatterometers', Remote Sens. 2018, 10(11), 1765, Nov. 8, 2018, 22 pages.

* cited by examiner

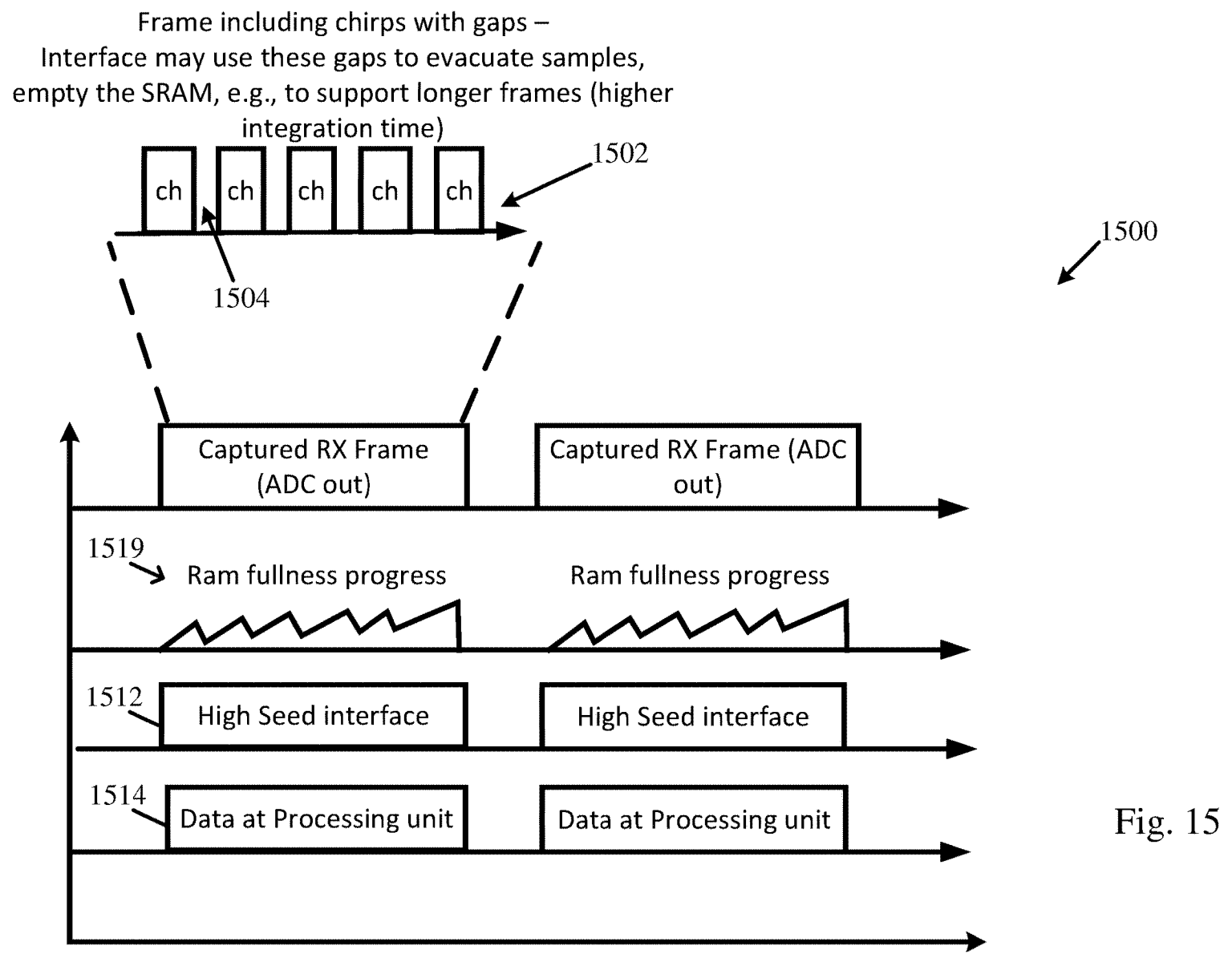

Frame including chirps with gaps – Interface may use these gaps to evacuate samples, empty the SRAM, e.g., to support longer frames (higher integration time)

1502 ch ch ch ch ch

1504

1500

Captured RX Frame (ADC out)

Captured RX Frame (ADC out)

1519

Ram fullness progress

Ram fullness progress

1512

High Seed interface

High Seed interface

1514

Data at Processing unit

Data at Processing unit

Fig. 15

APPARATUS, SYSTEM, AND METHOD OF SCHEDULING RADAR TRANSMISSIONS

CROSS REFERENCE

This application claims the benefit of and priority from U.S. Provisional Patent Application No. 63/247,562 entitled "RADAR APPARATUS, SYSTEM, AND METHOD", filed Sep. 23, 2021, the entire disclosure of which is incorporated herein by reference.

TECHNICAL FIELD

Aspects described herein generally relate to scheduling radar transmissions.

BACKGROUND

Various types of devices and systems, for example, autonomous and/or robotic devices, e.g., autonomous vehicles and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LiDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 15 is a schematic illustration of a radar scheduling and processing scheme, in accordance with some demonstrative aspects.

DETAILED DESCRIPTION

Figure 1:
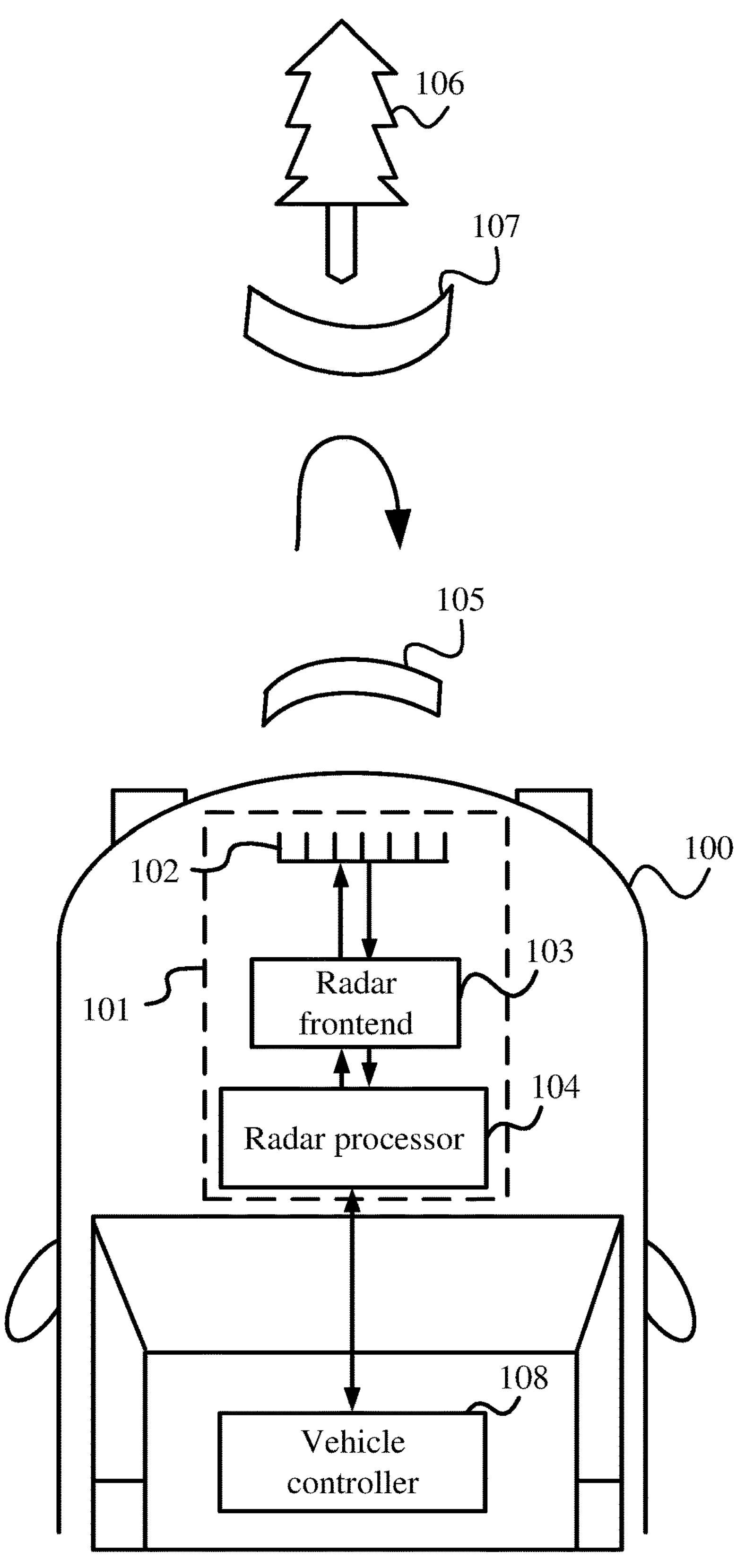
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, or design described herein as "exemplary" or "demonstrative" is not necessarily to be construed as preferred or advantageous over other aspects, or designs.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in *SAE J3016 2018: Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

An "assisted vehicle" may describe a vehicle capable of informing a driver or occupant of the vehicle of sensed data or information derived therefrom.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, some functions associated with the circuitry may be implemented by one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a MIMO (Multiple-Input Multiple-Output) array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, an assisted vehicle system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below.

In one example, radar device 101 may be mounted onto, placed, e.g., directly, onto, or attached to, vehicle 100.

In some demonstrative aspects, vehicle 100 may include a plurality of radar aspects, vehicle 100 may include a single radar device 101.

In some demonstrative aspects, vehicle 100 may include a plurality of radar devices 101, which may be configured to cover a field of view of 360 degrees around vehicle 100.

In other aspects, vehicle 100 may include any other suitable count, arrangement, and/or configuration of radar devices and/or units, which may be suitable to cover any other field of view, e.g., a field of view of less than 360 degrees.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer or a circulator, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
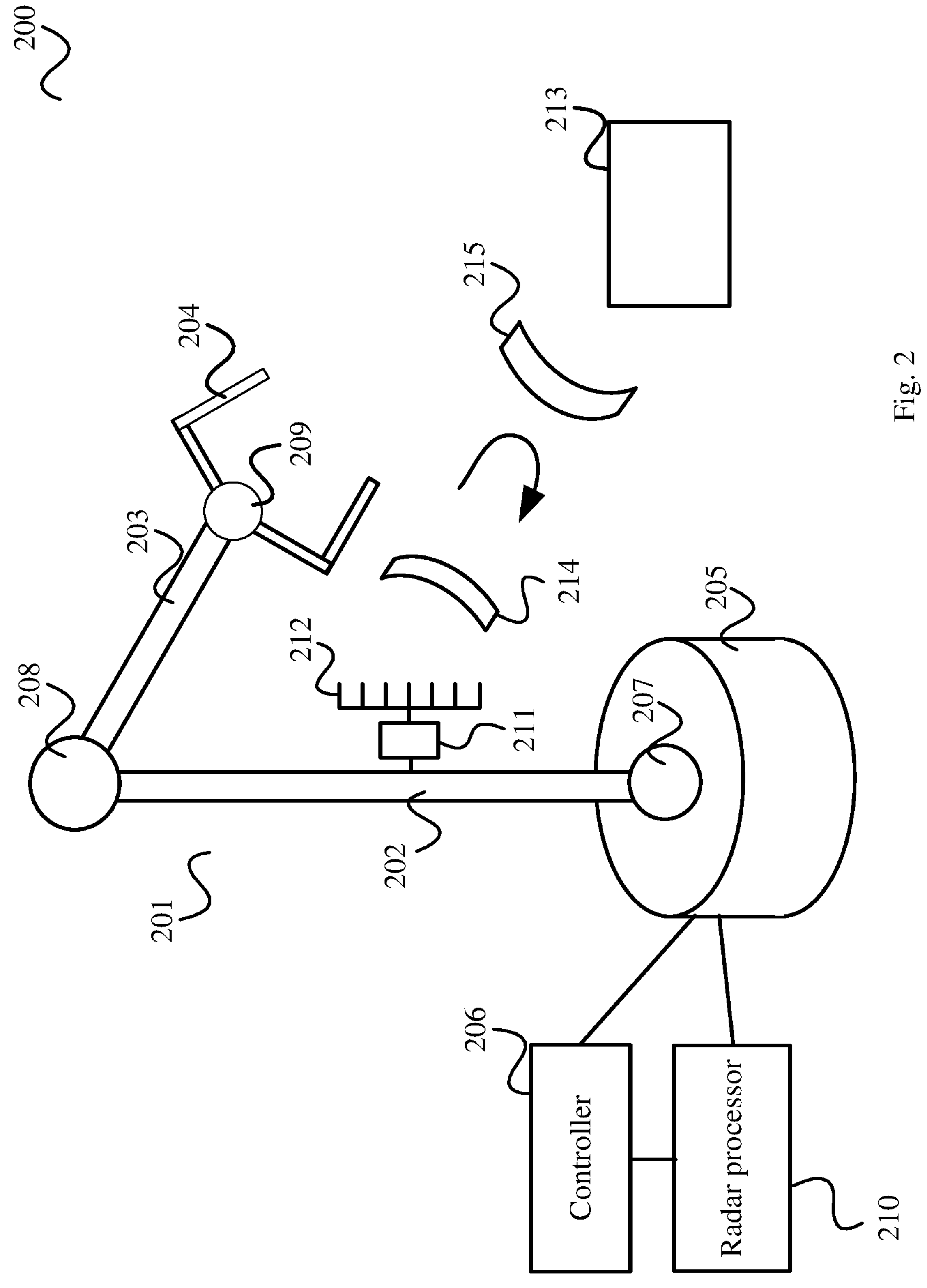
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
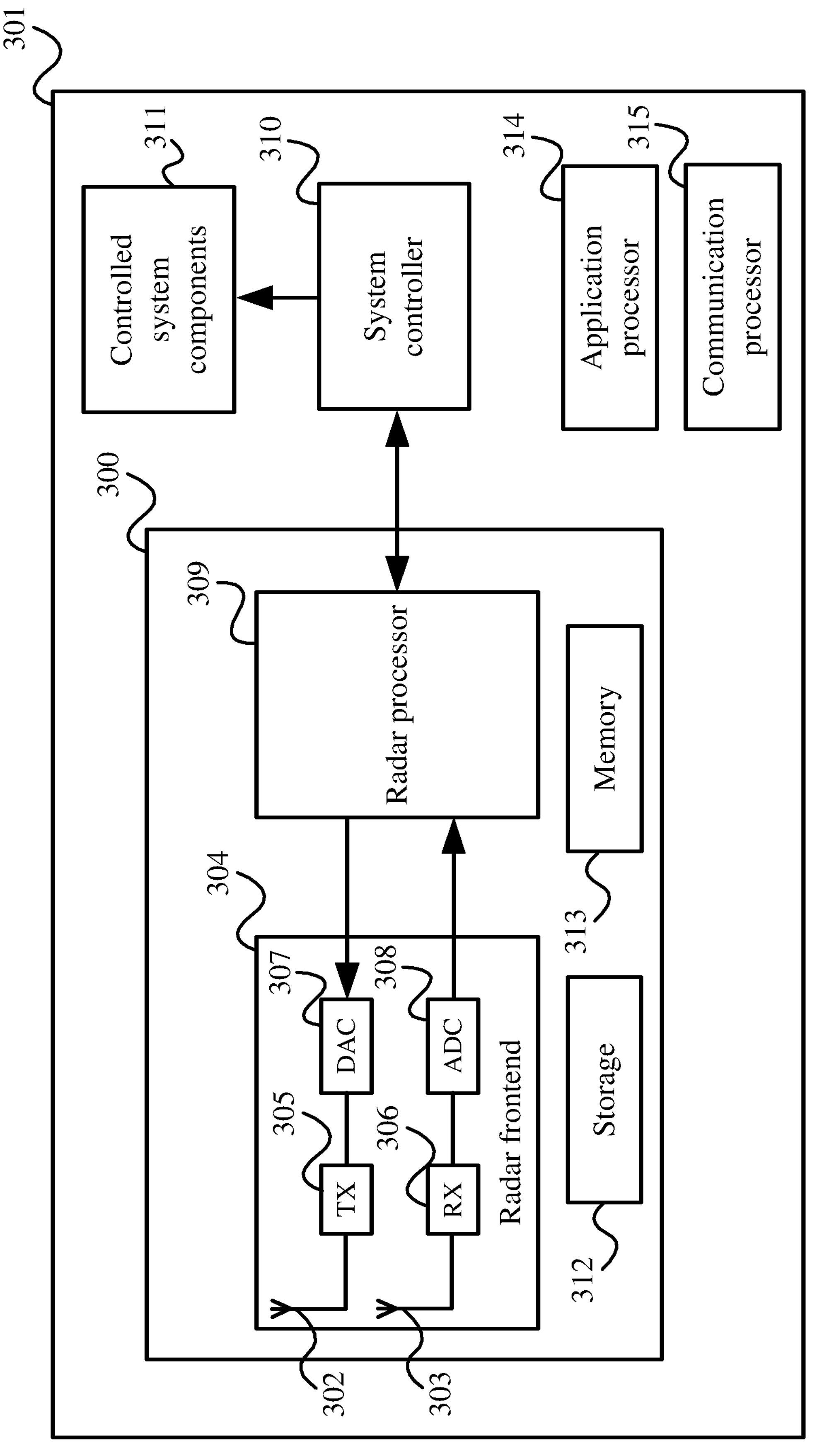
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
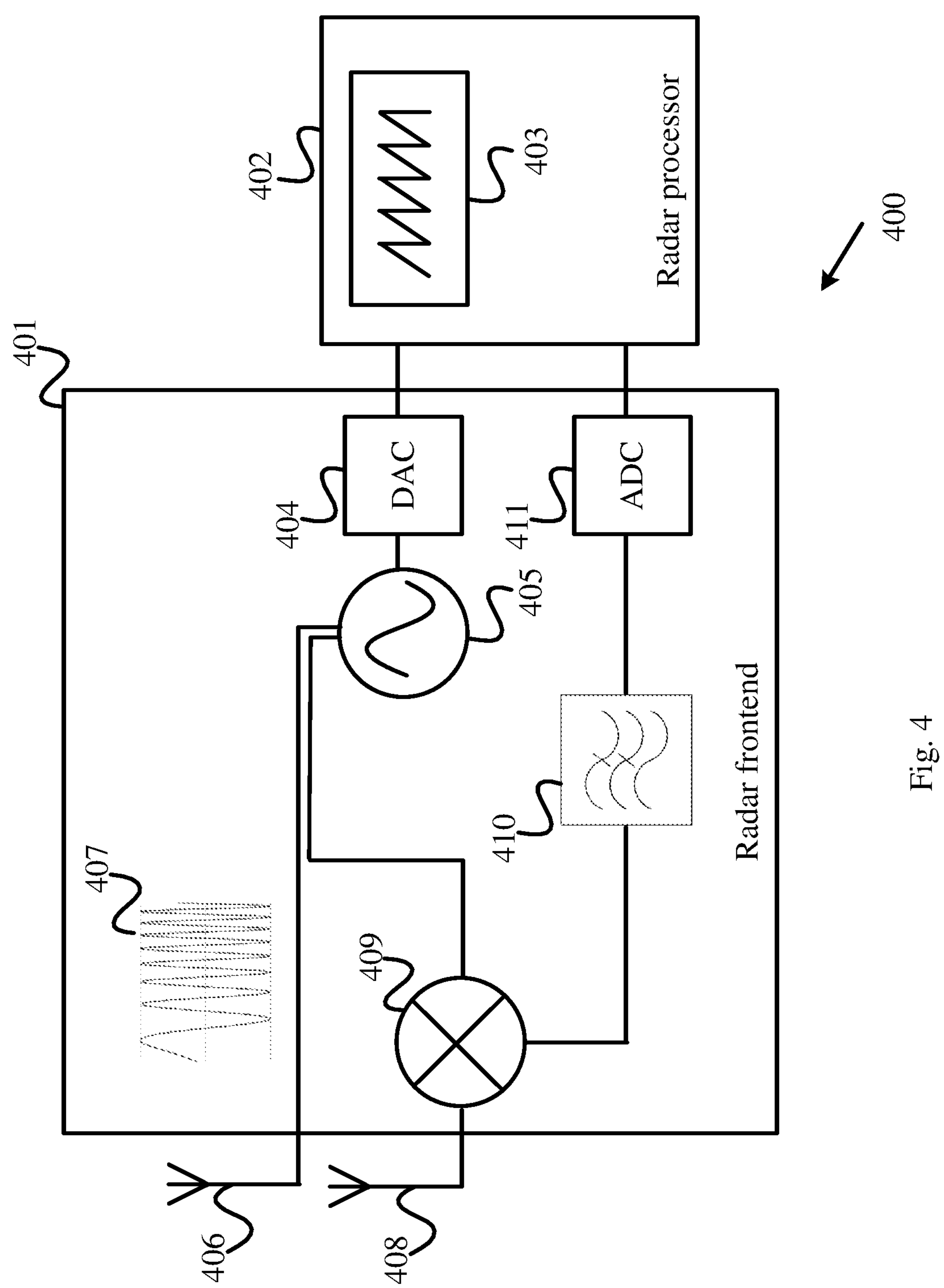
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
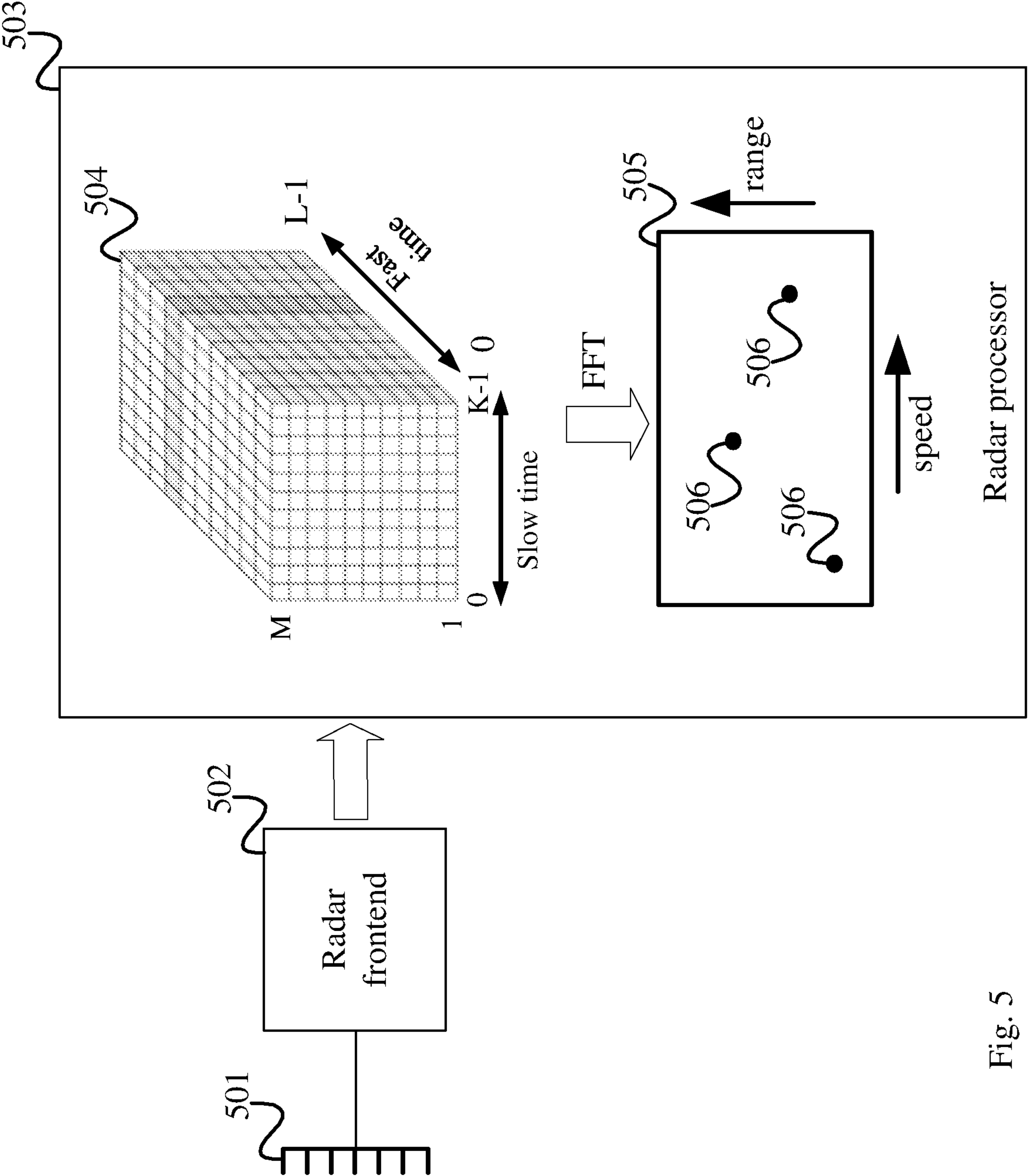
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 107 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
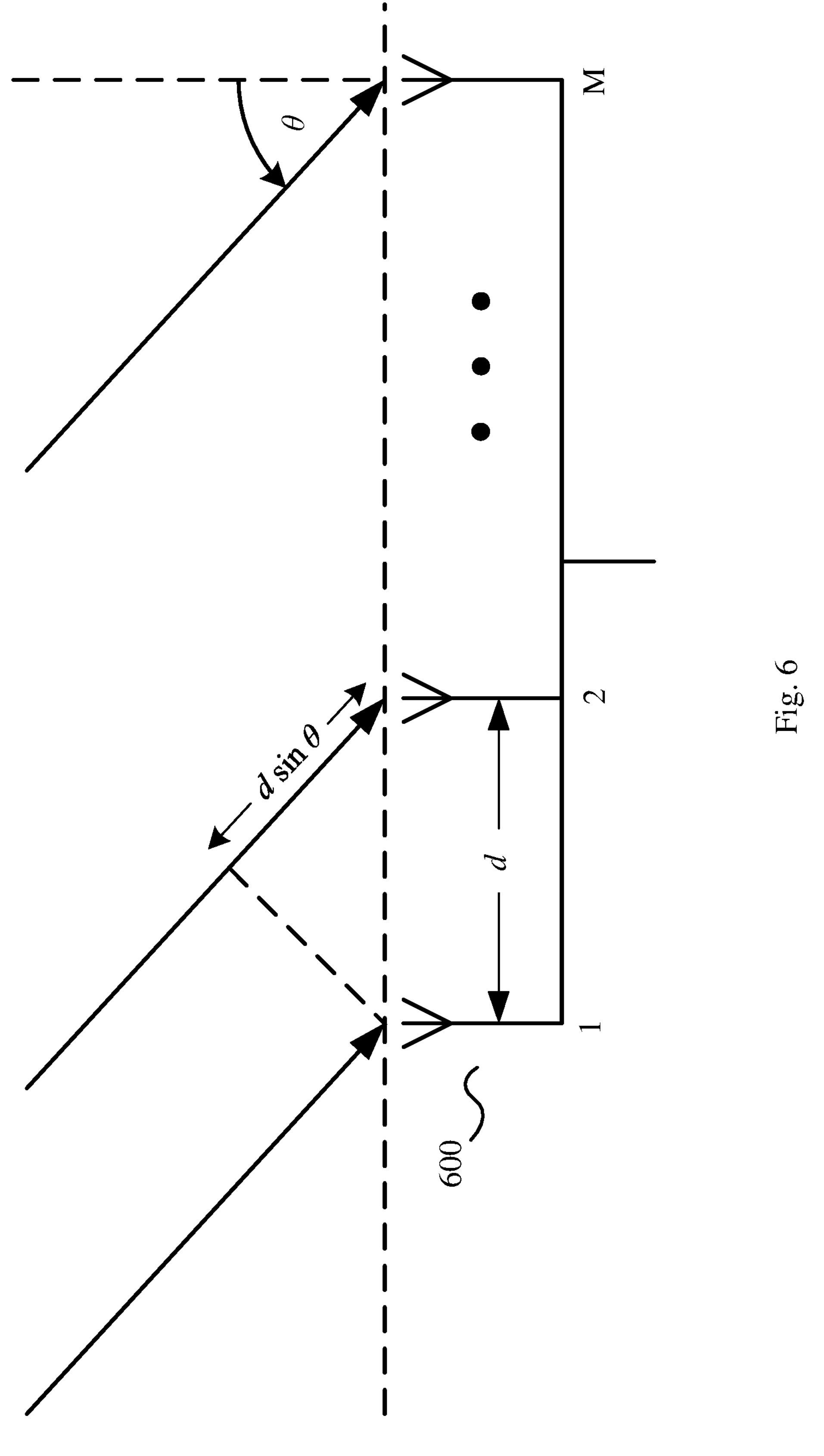
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 600 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
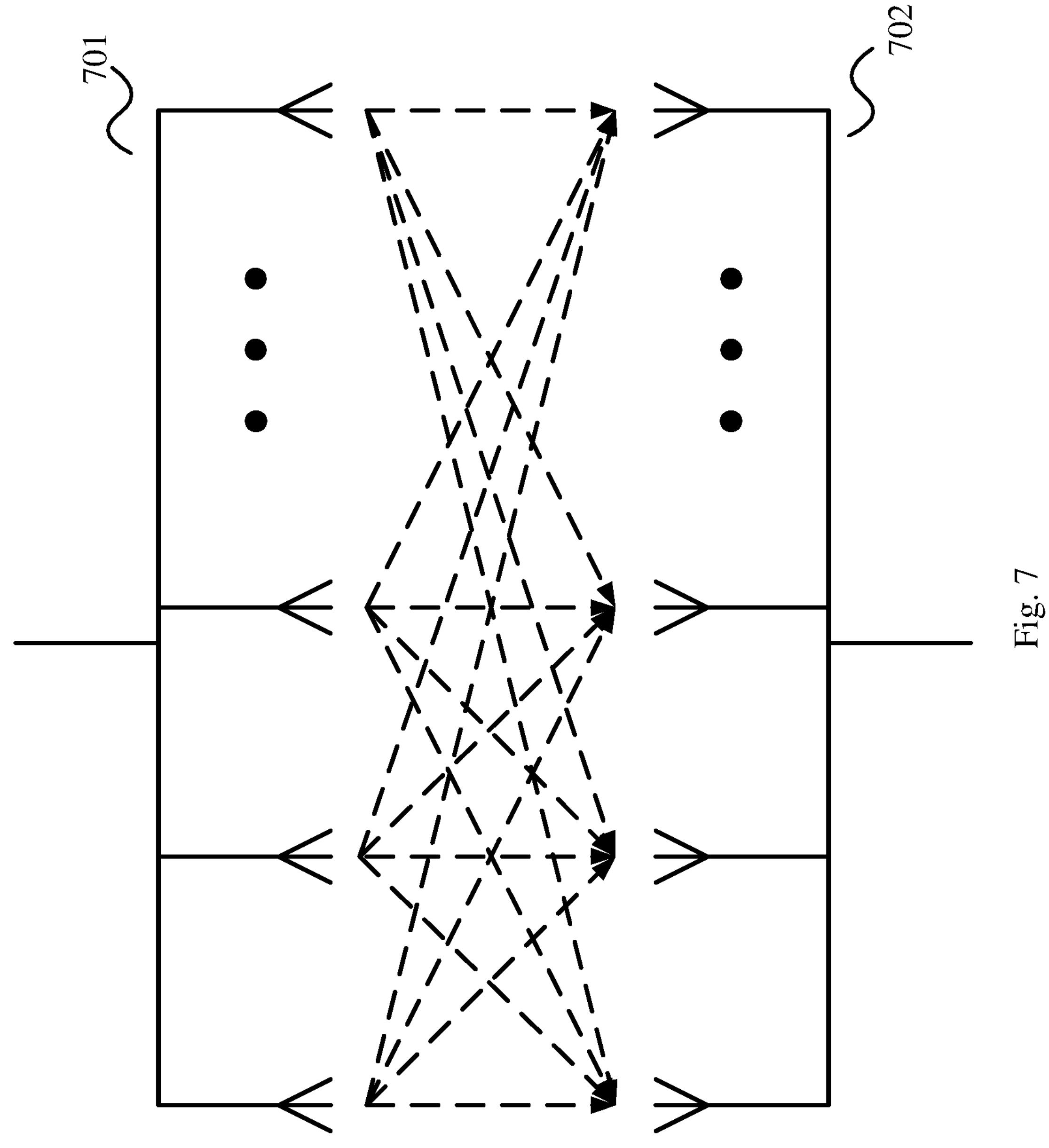
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
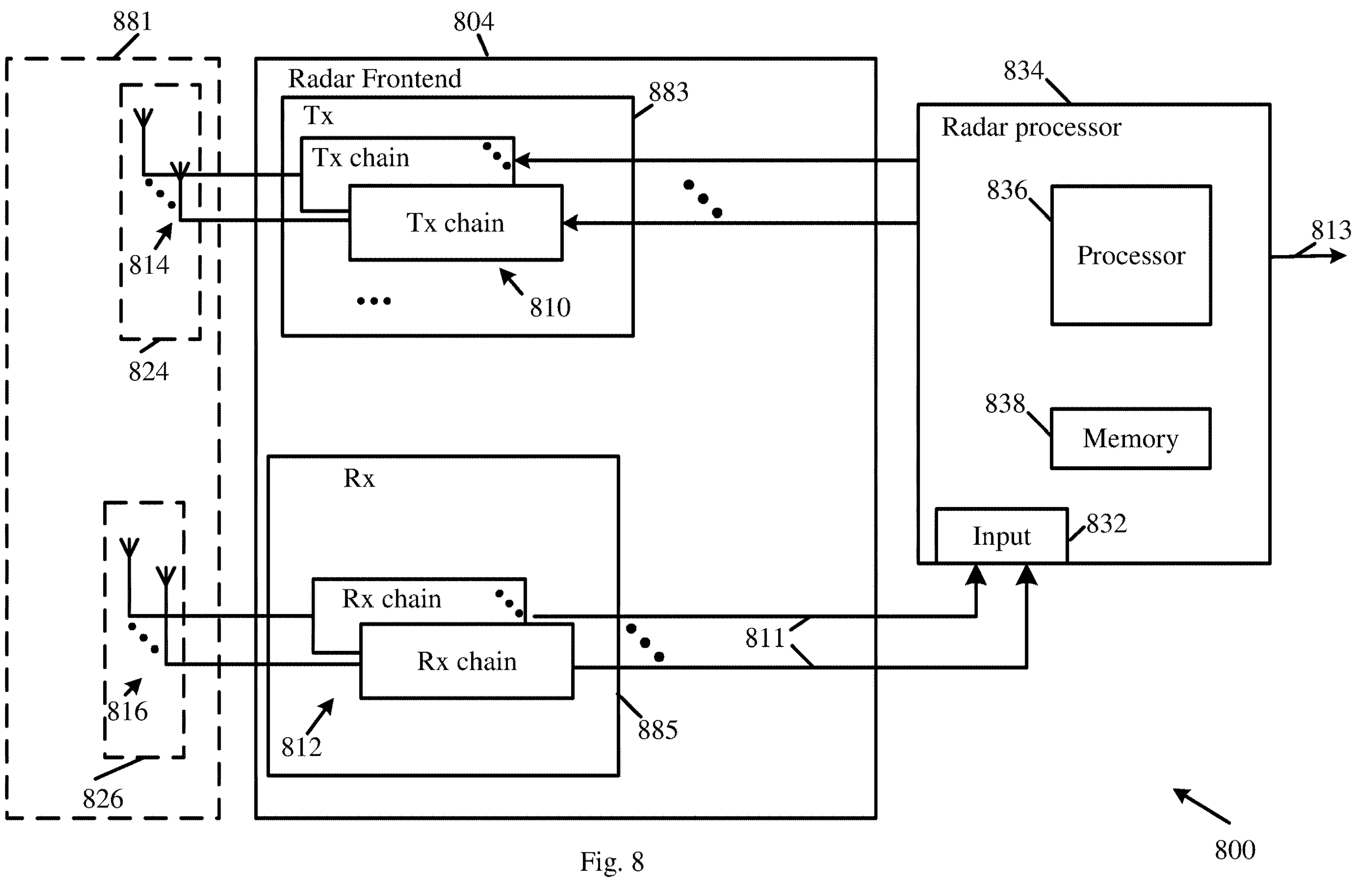
FIG. 8 is a schematic block diagram illustration of elements of a radar device including a radar frontend and a radar processor, in accordance with some demonstrative aspects.

FIG. 8 is a schematic block diagram illustration of elements of a radar device 800, in accordance with some demonstrative aspects. For example, radar device 101 (FIG. 1), radar device 300 (FIG. 3), and/or radar device 400 (FIG. 4), may include one or more elements of radar device 800, and/or may perform one or more operations and/or functionalities of radar device 800.

In some demonstrative aspects, as shown in FIG. 8, radar device 800 may include a radar frontend 804 and a radar processor 834. For example, radar frontend 103 (FIG. 1), radar frontend 211 (FIG. 2), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, processor 836 may interface with memory 838, for example, via a memory interface 839.

In some demonstrative aspects, processor 836 may be configured to access memory 838, e.g., to write data to memory 838 and/or to read data from memory 838, for example, via memory interface 839.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data. In one example, the range information and/or Doppler information may be determined based on a Cross-Correlation (XCORR) operation, which may be applied to the radar Rx data. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, the radar information 813 may include target tracking information corresponding to a plurality of targets in an environment of the radar device 800, e.g., as described below.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a radar system may include a plurality of radar devices 800. For example, vehicle 100 (FIG. 1) may include a plurality of radar devices 800, e.g., as described below.

Figure 9:
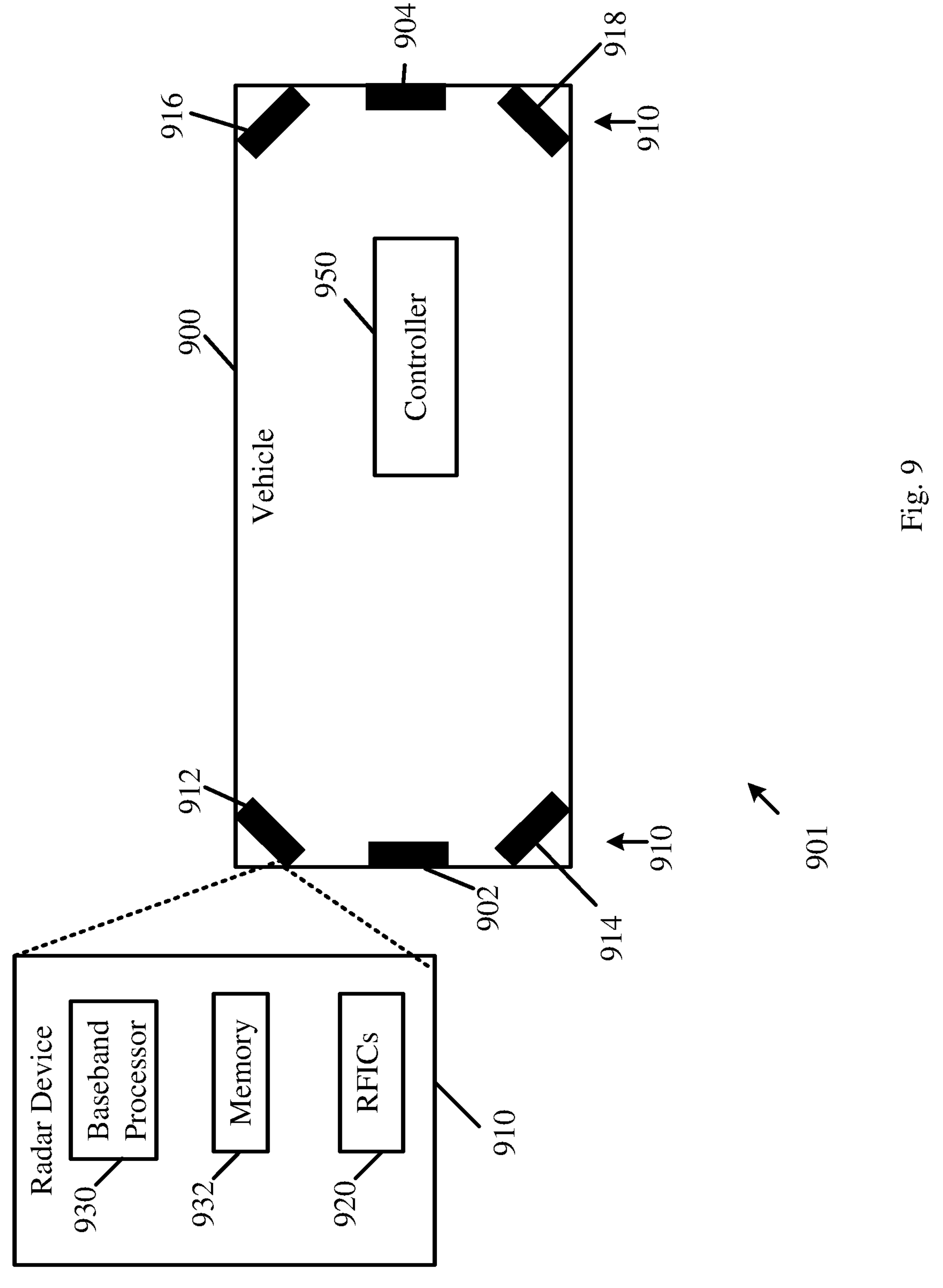
FIG. 9 is a schematic illustration of a radar system including a plurality of radar devices implemented in a vehicle, in accordance with some demonstrative aspects.

Reference is made to FIG. 9, which schematically illustrates a radar system 901 including a plurality of Radio Head (RH) radar devices (also referred to as RHs) 910 implemented in a vehicle 900, in accordance with some demonstrative aspects.

In some demonstrative aspects, as shown in FIG. 9, the plurality of RH radar devices 910 may be located, for example, at a plurality of positions around vehicle 900, for example, to provide radar sensing at a large field of view around vehicle 900, e.g., as described below.

In some demonstrative aspects, as shown in FIG. 9, the plurality of RH radar devices 910 may include, for example, six RH radar devices 910, e.g., as described below.

In some demonstrative aspects, the plurality of RH radar devices 910 may be located, for example, at a plurality of positions around vehicle 900, which may be configured to support 360-degrees radar sensing, e.g., a field of view of 360 degrees surrounding the vehicle 900, e.g., as described below.

In one example, the 360-degrees radar sensing may allow to provide a radar-based view of substantially all surroundings around vehicle 900, e.g., as described below.

In other aspects, the plurality of RH radar devices 910 may include any other number of RH radar devices 910, e.g., less than six radar devices or more than six radar devices.

In other aspects, the plurality of RH radar devices 910 may be positioned at any other locations and/or according to any other arrangement, which may support radar sensing at any other field of view around vehicle 900, e.g., 360-degrees radar sensing or radar sensing of any other field of view.

In some demonstrative aspects, as shown in FIG. 9, vehicle 900 may include a first RH radar device 902, e.g., a front RH, at a front-side of vehicle 900.

In some demonstrative aspects, as shown in FIG. 9, vehicle 900 may include a second RH radar device 904, e.g., a back RH, at a back-side of vehicle 900.

In some demonstrative aspects, as shown in FIG. 9, vehicle 900 may include one or more of RH radar devices at one or more respective corners of vehicle 900. For example, vehicle 900 may include a first corner RH radar device 912 at a first corner of vehicle 900, a second corner RH radar device 914 at a second corner of vehicle 900, a third corner RH radar device 916 at a third corner of vehicle 900, and/or a fourth corner RH radar device 918 at a fourth corner of vehicle 900.

In some demonstrative aspects, vehicle 900 may include one, some, or all, of the plurality of RH radar devices 910 shown in FIG. 9. For example, vehicle 900 may include the front RH radar device 902 and/or back RH radar device 904.

In other aspects, vehicle 900 may include any other additional or alternative radar devices, for example, at any other additional or alternative positions around vehicle 900. In one example, vehicle 900 may include a side radar, e.g., on a side of vehicle 900.

In some demonstrative aspects, as shown in FIG. 9, vehicle 900 may include a radar system controller 950 configured to control one or more, e.g., some or all, of the RH radar devices 910.

In some demonstrative aspects, at least part of the functionality of radar system controller 950 may be implemented by a dedicated controller, e.g., a dedicated system controller or central controller, which may be separate from the RH radar devices 910, and may be configured to control some or all of the RH radar devices 910.

In some demonstrative aspects, at least part of the functionality of radar system controller 950 may be implemented as part of at least one RH radar device 910.

In some demonstrative aspects, at least part of the functionality of radar system controller 950 may be implemented by a radar processor of an RH radar device 910. For example, radar processor 834 (FIG. 8) may include one or more elements of radar system controller 950, and/or may perform one or more operations and/or functionalities of radar system controller 950.

In some demonstrative aspects, at least part of the functionality of radar system controller 950 may be implemented by a system controller of vehicle 900. For example, vehicle controller 108 (FIG. 1) may include one or more elements of radar system controller 950, and/or may perform one or more operations and/or functionalities of radar system controller 950.

In other aspects, one or more functionalities of system controller 950 may be implemented as part of any other element of vehicle 900.

In some demonstrative aspects, as shown in FIG. 9, an RH radar device 910 of the plurality of RH radar devices 910, may include a baseband processor 930 (also referred to as a "Baseband Processing Unit (BPU)"), which may be configured to control communication of radar signals by the RH radar device 910, and/or to process radar signals communicated by the RH radar device 910. For example, baseband processor 930 may include one or more elements of radar processor 834 (FIG. 8), and/or may perform one or more operations and/or functionalities of radar processor 834 (FIG. 8).

In other aspects, an RH radar device 910 of the plurality of RH radar devices 910 may exclude one or more, e.g., some or all, functionalities of baseband processor 930. For example, controller 950 may be configured to perform one or more, e.g., some or all, functionalities of the baseband processor 930 for the RH.

In one example, controller 950 may be configured to perform baseband processing for all RH radar devices 910, and all RH radio devices 910 may be implemented without baseband processors 930.

In another example, controller 950 may be configured to perform baseband processing for one or more first RH radar devices 910, and the one or more first RH radio devices 910 may be implemented without baseband processors 930; and/or one or more second RH radar devices 910 may be implemented with one or more functionalities, e.g., some or all functionalities, of baseband processors 930.

In another example, one or more, e.g., some or all, RH radar devices 910 may be implemented with one or more functionalities, e.g., partial functionalities or full functionalities, of baseband processors 930.

In some demonstrative aspects, baseband processor 930 may include one or more components and/or elements configured for digital processing of radar signals communicated by the RH radar device 910, e.g., as described below.

In some demonstrative aspects, baseband processor 930 may include one or more FFT engines, matrix multiplication engines, DSP processors, and/or any other additional or alternative baseband, e.g., digital, processing components.

In some demonstrative aspects, as shown in FIG. 9, RH radar device 910 may include a memory 932, which may be configured to store data processed by, and/or to be processed by, baseband processor 930. For example, memory 932 may include one or more elements of memory 838 (FIG. 8), and/or may perform one or more operations and/or functionalities of memory 838 (FIG. 8).

In some demonstrative aspects, memory 932 may include an internal memory, and/or an interface to one or more external memories, e.g., an external Double Data Rate (DDR) memory, and/or any other type of memory.

In other aspects, an RH radar device 910 of the plurality of RH radar devices 910 may exclude memory 932. For example, the RH radar device 910 may be configured to provide radar data to controller 950, e.g., in the form of raw radar data.

In some demonstrative aspects, as shown in FIG. 9, RH radar device 910 may include one or more RF units, e.g., in the form of one or more RF Integrated Chips (RFICs) 920, which may be configured to communicate radar signals, e.g., as described below.

For example, an RFIC 920 may include one or more elements of front-end 804 (FIG. 8), and/or may perform one or more operations and/or functionalities of front-end 804 (FIG. 8).

In some demonstrative aspects, the plurality of RFICs 920 may be operable to form a radar antenna array including one or more Tx antenna arrays and one or more Rx antenna arrays.

For example, the plurality of RFICs 920 may be operable to form MIMO radar antenna 881 (FIG. 8) including Tx arrays 824 (FIG. 8), and/or Rx arrays 826 (FIG. 8).

In some demonstrative aspects, a radar device, e.g., radar device 800 (FIG. 8) and/or radar device 910 (FIG. 9), may be configured as, and/or to perform one or more functionalities and/or operations of, a digital-based processing radar (also referred to as "digital radar", or a Software (SW) Defined Radar (SDR"), e.g., as described below.

For example, in some use cases, scenarios and/or implementations, there may be a technical need to move from an architecture, which is based on a rigid analog implementation, to an architecture based on an SDR scheme.

In some demonstrative aspects, for example, an SDR may be implemented to provide a technical solution to support robust and/or advanced radar communication and/or processing capabilities. In one example, an SDR may be implemented to provide a technical solution to support robust and/or advanced modulation schemes.

In some demonstrative aspects, an SDR scheme may be configured to implement one or more Analog to Digital Converters (ADCs), e.g., high bandwidth (BW) ADCs, which may be configured to capture a wide BW, e.g., an entire BW, of raw data of a baseband spectrum of radar chirps.

In some demonstrative aspects, high BW chirps, e.g., in an order of 1 GHz (O(1 GHz)) or nay other BW, may be implemented, for example, to support a technical solution to provide high resolution, e.g., high range resolution, for example, for imaging radar.

In some demonstrative aspects, the implementation of high BW chirps may utilize a vast amount of data being involved in the processing flow, e.g., to process the Rx radar signals.

In some demonstrative aspects, in some use cases and/or implementations, there may be a need to support a technical solution to transfer a large amount of data, for example, from an RF Front End (FE), for example, an RF chip to a processing unit, e.g., from RF front end 804 (FIG. 8) to radar processor 834 (FIG. 8), and/or from RFIC 920 (FIG. 9) to baseband processor 930 (FIG. 9) and/or controller 950 (FIG. 9).

For example, Hardware (HW) configured for high BW may be implemented support fast transfer of the data from the RF chip to the processing unit, which may be implemented by a different silicon chip than the RF chip. This HW to support the high BW may scale linearly, which may significantly increase the area and/or power of the entire product.

In some demonstrative aspects, in some use cases, scenarios, and/or implementations, there may be one or more technical issues, for example, to support very high BW ADC captures, for example, when using continuous Tx/Rx modes, e.g., as described below.

In some demonstrative aspects, in some use cases, scenarios, and/or implementations, there may be a need to address one or more technical issues, for example, to support very high BW ADC captures, for example, when implementing a radar device using high BW chirps, e.g., as described below.

For example, a frame duration and/or an integration time may be limited according to some system attributes, for example, a system interface speed, e.g., for transferring data form the RF unit to a main processing unit (MPU), and/or local memories, e.g., which may save sampled data until the interfaces will evacuate the memory to the MPU. For example, such limitation on the frame duration and/or the integration time may eventually impact a Signal to Noise Ratio (SNR) Key Performance Indicator (KPI), e.g., which may remain lower.

For example, in some implementations of analog de-chirp systems, the ADC may capture only the Intermediate Frequency (IF) of the signal. Accordingly, for such implementations, by nature, the ADC rates may be slower, and interfaces in the system, which may usually not be very fast, may be sufficient to support a continuous Tx/Rx mode, e.g., even for wide chirp BW. However, even in such analog de-chirp systems, the ADC BW may increase, e.g., in future models. This increase in the ADC BW may result in a technical issue, for example, in case there is a significant gap between the ADC sampling rate and the interface data rate to the MPU. Accordingly, at least some of the aspects, technical solutions and/or implementations described herein with respect to digital radar may also be implemented for analog de-chirp systems, and/or any other systems.

Figure 10:
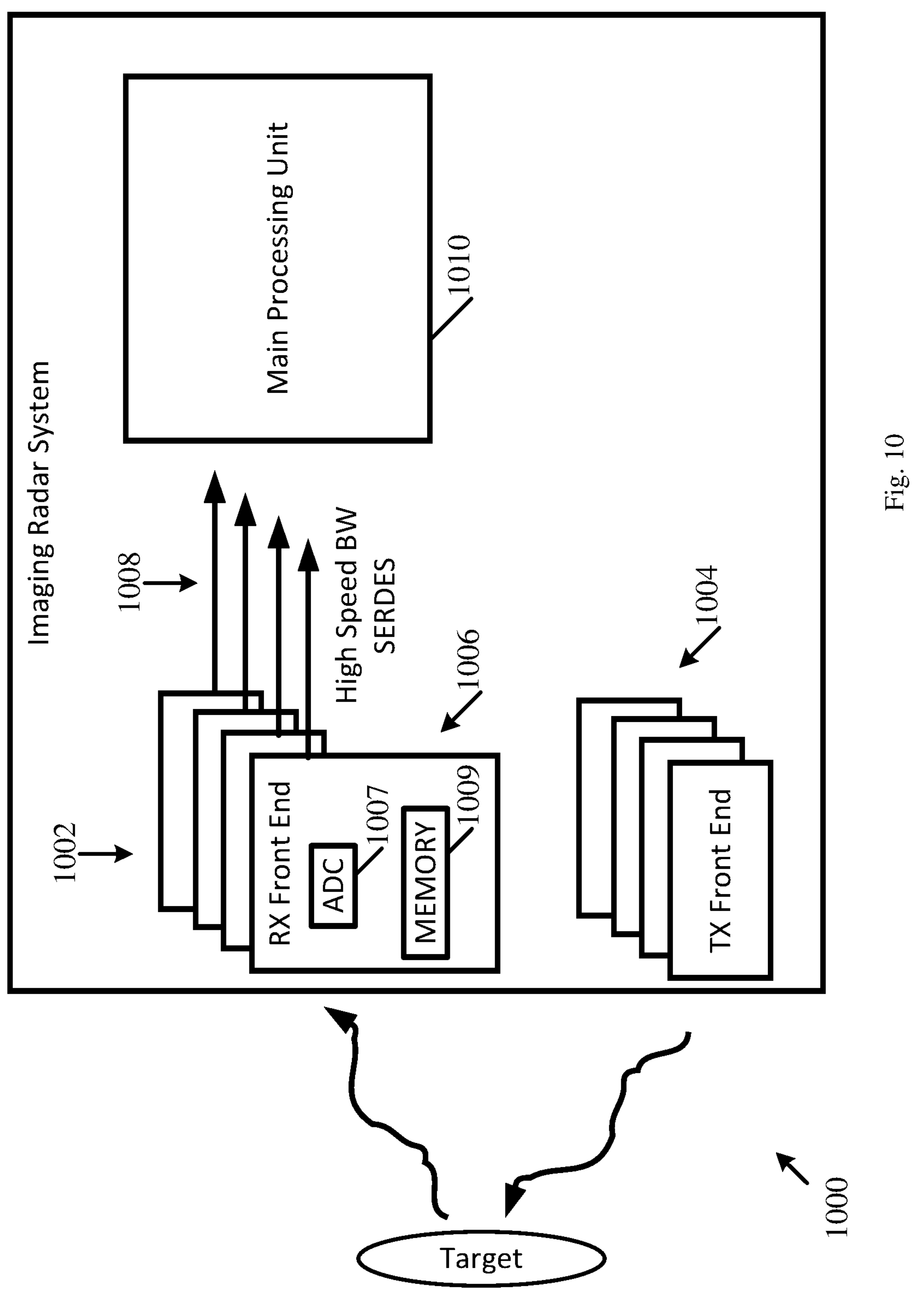
FIG. 10 is a schematic illustration of a radar system architecture, in accordance with some demonstrative aspects.

Reference is made to FIG. 10, which schematically illustrates a radar architecture 1000, in accordance with some demonstrative aspects.

In some demonstrative aspects, one or more elements of the radar architecture 1000 may be configured to provide a technical solution to support a SW-defined radar scheme, e.g., as described below. In other aspects, one or more elements of the radar architecture of FIG. 10 may be implemented with respect to any other radar device and/or radar system.

In some demonstrative aspects, radar device 800 (FIG. 8), radar device 910 (FIG. 9), and/or radar system 901 (FIG. 9), may include one or more elements of, and/or may be configured to perform one or more functionalities and/or operations of, the radar architecture 1000.

In some demonstrative aspects, as shown in FIG. 10, the radar architecture 1000 may include one or more radar front ends 1002, e.g., to support communication of Tx and/or Rx signals. For example, the one or more front ends 1002 may include one or more elements of, and/or may be configured to perform one or more functionalities and/or operations of, radar frontend 804 (FIG. 8).

In some demonstrative aspects, as shown in FIG. 10, the radar architecture 1000 may include one or more Tx front ends 1004 configured generate and/or transmit radar Tx signals via one or more Tx antennas. For example, a Tx front end 1004 may include a plurality of Tx chains configured to generate and transmit radar Tx RF signals via a plurality of Tx antennas. For example, a Tx front end 1004 may include one or more elements of, and/or may be configured to perform one or more functionalities and/or operations of, transmitter 883 (FIG. 8).

In some demonstrative aspects, as shown in FIG. 10, the radar architecture 1000 may include one or more Rx front ends 1006 configured receive and/or process radar Rx signals, which may be received via one or more Rx antennas, for example, based on the radar Tx signals transmitted by the one or more Tx front ends 1004. For example, an Rx front end 1006 may include a plurality of Rx chains configured to receive and process the radar Rx RF signals received via a plurality of Rx antennas. For example, an Rx front end 1006 may include one or more elements of, and/or may be configured to perform one or more functionalities and/or operations of, receiver 885 (FIG. 8).

In some demonstrative aspects, an Rx front end 1006 may include an ADC 1007, for example, a high BW ADC, e.g., a very high BW ADC, which may be configured to capture a wide BB, e.g., a full BB, of a received chirp for digital processing. In one example, the ADC 1007 may be configured to support a chirp BW of up to about 1 GHz, or any other BW.

In some demonstrative aspects, as shown in FIG. 10, the radar architecture 1000 may include a Main processing unit (MPU) 1010, which may be configured to perform digital processing of Rx data delivered from the one or more Rx front ends 1006. For example, the MPU 1010 may be configured with high compute power for digital processing. For example, radar processor 834 (FIG. 8), baseband processor 930 (FIG. 9) and/or controller 950 (FIG. 9) may include one or more elements of, and/or may be configured to perform one or more functionalities and/or operations of, MPU 1010.

In some demonstrative aspects, as shown in FIG. 10, the radar architecture 1000 may include one or more high speed interfaces 1008 configured to deliver the Rx data to the MPU 1010, for example, in a relatively low latency, e.g., a latency sufficient to maintain radar KPIs, imaging perception performance, and/or any other criteria.

In some demonstrative aspects, as shown in FIG. 10, an Rx front end 1006 may include a memory 1009, which may be configured, for example, to store Rx data generated by the Rx front end 1006, for example, until the interface 1008 can send the Rx data to the MPU 1010.

Figure 11:
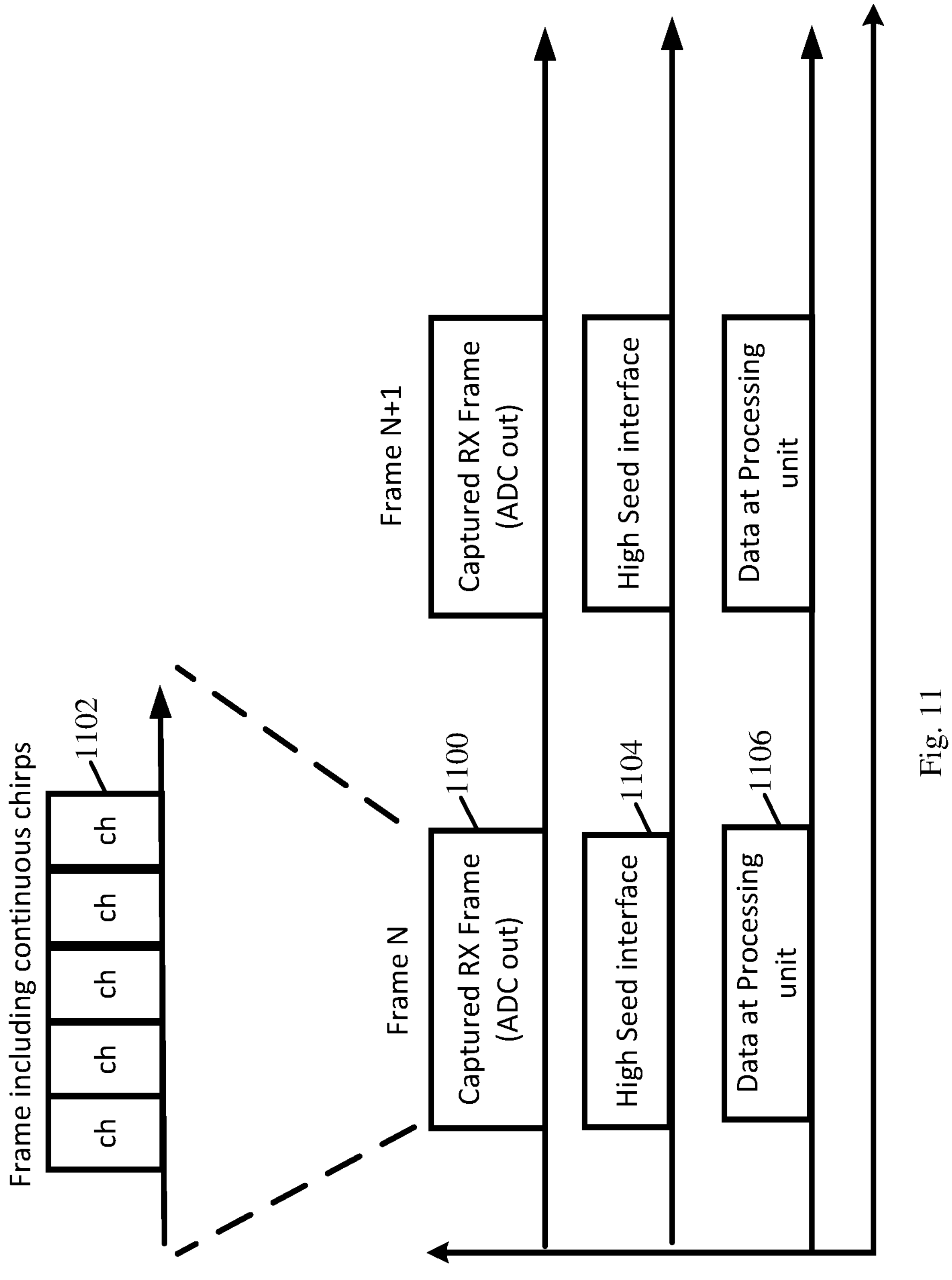
FIGS. 11-13 are schematic illustrations of a radar scheduling and processing scheme, to demonstrate a technical problem, which may be addressed in accordance with some demonstrative aspects.
Figure 12:
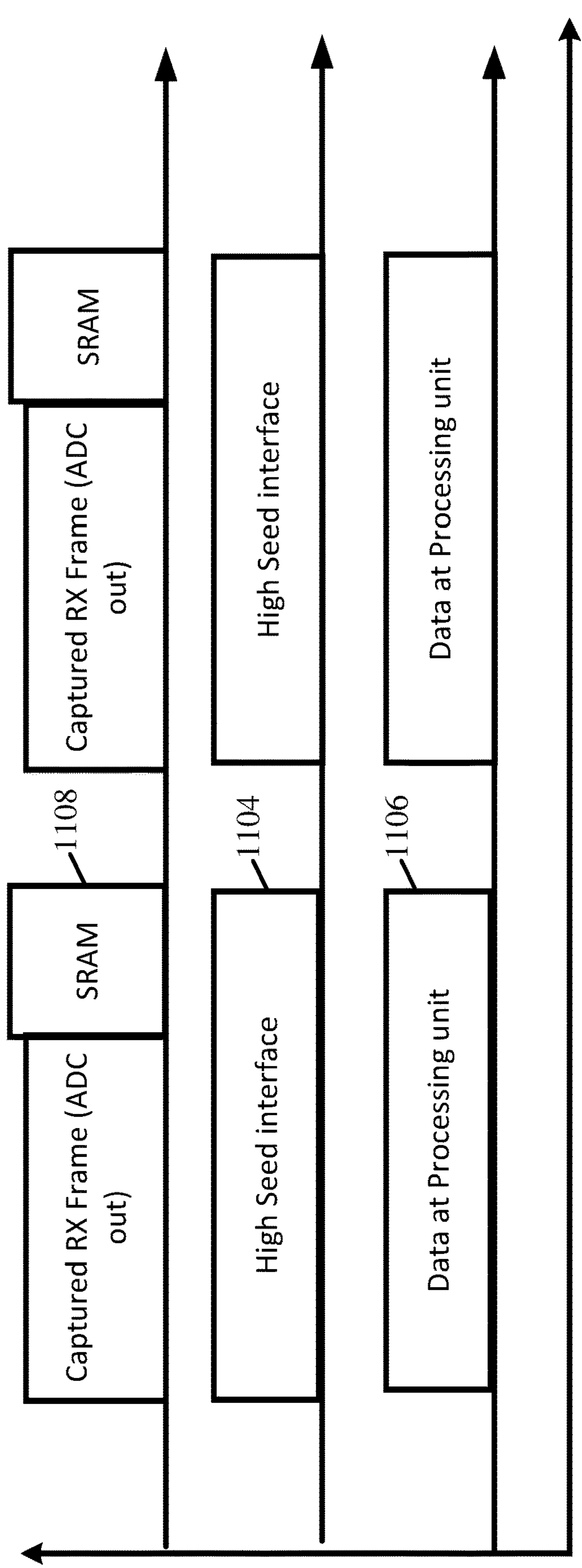
Figure 13:
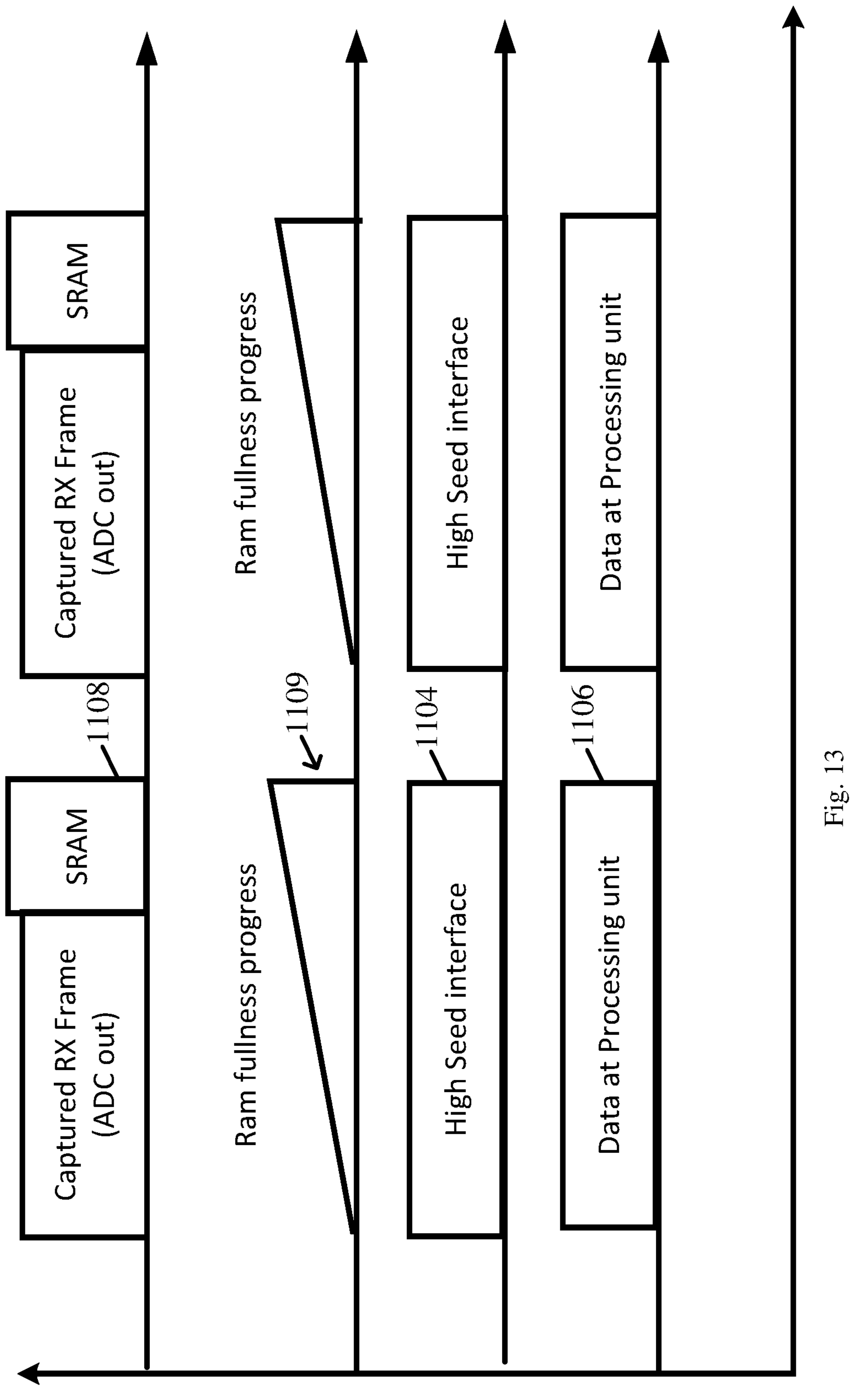

Reference is made to FIGS. 11-13, which schematically illustrate a radar scheduling and processing scheme, to demonstrate a technical problem, which may be addressed in accordance with some demonstrative aspects.

For example, as shown in FIG. 11, captured Rx data of an N-th radar frame 1100 may be provided by an ADC, e.g., ADC 1007 (FIG. 10), for example, based on Radar Rx signals corresponding to a plurality of radar transmissions (chirps) 1102.

For example, as shown in FIG. 11, captured Rx data of an N-th radar frame 1200 may be communicated by a high speed interface 1104 to a processing unit 1106.

For example, as shown in FIG. 11, in some use cases, scenarios and/or implementations, in some radar systems, when the ratio between an ADC sampling frequency of the ADC and a rate of the high speed interface 1104 allows it, the radar system may keep a minimum delay between chirps within the frames (e.g., according to a B2B method or any other method), for example, to achieve both high SNR and a good Vmax. In one example, Vmax may be defined by the Period Interval (PRI) between the chirps. In such a case, as shown in FIG. 11, the radar system may work within the frame in a continues-mode, e.g., including a continuous sequence of the radar chirps 1102.

However, as shown in FIGS. 12-13, in some use cases, scenarios and/or implementations, for example, a wide BW of chirp may be used, e.g., for better range resolution. In such cases, as shown in FIGS. 12-13, the interface 1104 may not be fast enough in sending the captured Rx data to the processing unit 1106.

For example, as shown in FIGS. 12-13, there may be a need to add "expensive" local memory, e.g., SRAM 1108, for example, in order to be able to capture the signals until the interface 1104 can evacuate them. This implementation may be combined, for example, with increasing the high speed interface BW 1104, which may introduce another increment in area and/or power. Accordingly, the processing scheme of FIGS. 12-13 may be inefficient, complex, non-scalable, and/or expensive.

For example, as shown in FIG. 13, looking closely at the memory utilization of the SRAM 1108, it can be seen that the memory utilization may be built incrementally (1109), e.g., over the entire radar frame.

In some demonstrative aspects, a radar device, e.g., radar device 800 (FIG. 8) and/or radar device 910 (FIG. 9), may be configured according to a radar burst mode, e.g., as described below.

In some demonstrative aspects, the radar burst mode may be configured to space radar chirps within the radar frame, e.g., as described below.

In some demonstrative aspects, the radar burst mode may be configured to space the chirps within the frame, for example, in a manner that may support use of the high speed interface 1104 to evacuate the memory 1108, e.g., between chirps.

In some demonstrative aspects, the burst mode may be configured to space the chirps within the radar frame, for example, to provide a technical solution to transmit more chirps and/or increase the frame, for example, even when using the same size of memory 1108, e.g., SRAM. This technical solution may support better integration time (SNR), and/or better velocity resolution (# of chirps).

In some demonstrative aspects, there may be a tradeoff between Max doppler and SNR, which may, for example, increase an overall performance of certain Radar modes, e.g., SRR (short range) or any other mode. For example, there may be radar modes, e.g., SRR, where it may be desired to support accurate detection (high BW), e.g., of even small targets (high SNR) of relative slow velocity/static obstacle (low Vmax).

In some demonstrative aspects, a radar device, e.g., radar device 800 (FIG. 8) and/or radar device 910 (FIG. 9), may be configured to implement a radar scheduling scheme for communication of radar signals, e.g., as described below.

In some demonstrative aspects, the radar scheduling scheme may be configured to provide a technical solution to maintain an SNR KPI, for example, while maintaining reduced or low system complexity, e.g., in terms of area and/or power, as described below.

In some demonstrative aspects, the radar scheduling scheme may be configured to provide a technical solution to maintain an ability to keep a processing flow simple, for example, by ensuring, e.g., if needed, a linear sampled signal in a doppler domain, e.g., as described below.

In some demonstrative aspects, a radar device, e.g., radar device 800 (FIG. 8) and/or radar device 910 (FIG. 9), may be configured to operate according to a mode of operation (also referred to as "burst mode"), which may implement a radar scheduling scheme configured for a burst mode frame structure, e.g., as described below.

In some demonstrative aspects, the burst mode may be configured to provide a technical solution to support extraction of data during the frame, for example, more efficiently, e.g., in a manner of required local memory and/or local High Speed Interface's BW, for example, while keeping a relatively high level of SNR for the signal (long integration time), and/or high speed resolution (# of chirps).

In some demonstrative aspects, in some use cases, scenarios, and/or implementations, the burst mode may be configured to provide a technical solution to support high SNR in a high BW may be an important target, or even a primary target. For example, in some use cases, scenarios, and/or implementations, detecting low Radar Cross Section (RCS) objects, e.g., a human being, may be very important or critical.

In some demonstrative aspects, the burst mode may be configured to provide a technical solution to ensure that an overall frame phase remains coherent between chirps/bursts, for example, to ensure that one or more next processing phases, e.g., a Doppler processing phase and/or any other processing phase, may remain relatively simple, e.g., to allow use of relatively simple, e.g., conventual, processing methods, such as Fast Fourier Transform (FFT).

In some demonstrative aspects, the burst mode may be implemented to provide a technical solution to support synchronized data capture between bursts. This technical solution may be important, and in some cases even critical, for SW defined Radars, which may require very accurate Baseband (BB) latency alignment within the V.A.

In some demonstrative aspects, the burst mode may be configured to provide a technical solution to allow keeping a radar system efficient, e.g., in a perspective of size and/or power, for example, in terms of a relatively low SRAM, high Speed interfaces, and/or PMIC control.

In some demonstrative aspects, the burst mode may be configured to provide a technical solution to improve, or even optimize, one or more radar SNR KPIs.

In some demonstrative aspects, a burst mode frame structure may be configured to provide a technical solution to support an ability to change one or more signal parameters, for example, a waveform and/or waveform's parameters and/or any other parameter, for example, within a frame. For example, the ability to change one or more signal parameters of the radar signal within the frame may provide a technical solution to increase frame diversity and/or making the frame non-periodic.

In some demonstrative aspects, the burst mode may be configured to communicate radar transmissions according to a burst mode frame structure, which may generate a transmitted radar signal including gaps between radar pulses (e.g., "bursts" or "chirps") within the same frame, e.g., as described below.

Figure 14:
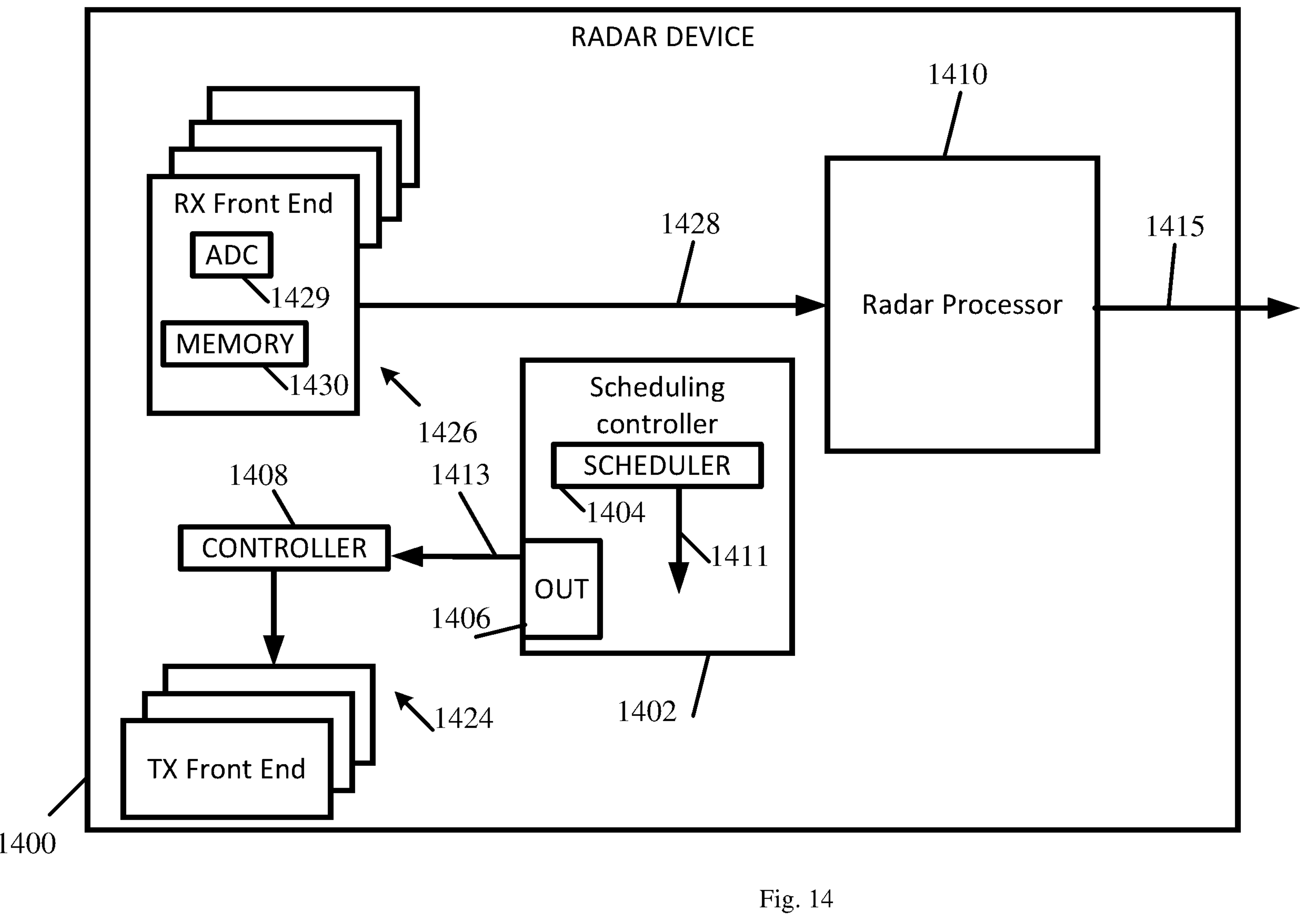
FIG. 14 is a schematic illustration of a radar device, in accordance with some demonstrative aspects.

Reference is made to FIG. 14, which schematically illustrates a radar device 1400, in accordance with some demonstrative aspects. For example, radar device 800 (FIG. 8) and/or radar device 910 (FIG. 9) may include one or more elements of, and/or may be configured to perform one or more functionalities and/or operations of, radar device 1400.

In some demonstrative aspects, radar device 1400 may include one or more Tx front ends 1424 configured generate and/or transmit radar Tx signals via one or more Tx antennas. For example, a Tx front end 1424 may include one or more elements of, and/or may be configured to perform one or more functionalities and/or operations of, transmitter 883 (FIG. 8).

In some demonstrative aspects, radar device 1400 may include one or more Rx front ends 1426 configured receive and/or process radar Rx signals, which may be received via one or more Rx antennas, for example, based on the radar Tx signals transmitted by the one or more Tx front ends 1424. For example, an Rx front end 1426 may include one or more elements of, and/or may be configured to perform one or more functionalities and/or operations of, receiver 885 (FIG. 8).

In some demonstrative aspects, an Rx front end 1426 may include an ADC 1429, for example, a high BW ADC, e.g., a very high BW ADC, which may be configured to capture a wide BB, e.g., a full BB, of a received chirp for digital processing.

In some demonstrative aspects, radar device 1400 may include a radar processor 1410, which may be configured to generate radar information 1415, for example, based on radar data, which is based on the radar transmissions performed by radar device 1400. For example, radar processor 834 (FIG. 8), baseband processor 930 (FIG. 9), controller 950 (FIG. 9) and/or may MPU 1010 (FIG. 10) may include one or more elements of, and/or may be configured to perform one or more functionalities and/or operations of, radar processor 1410.

In some demonstrative aspects, radar processor 140 may be configured to process radar data delivered from the one or more Rx front ends 1426. For example, the radar data may include radar signal information, which may be based on received signals, which are received by the Rx FE 1426 based on the radar transmissions performed by Tx FE 1424.

In some demonstrative aspects, radar device 1400 may include an interface 1428 configured to deliver the radar data from the Rx front end 1426 to radar processor 1410.

In some demonstrative aspects, Rx FE 1426 may include a memory 1430 to store the radar data generated by Rx FE 1426, for example, to temporarily store the radar data, e.g., until the radar data is transmitted by the interface 1428 to the radar processor 1410.

In some demonstrative aspects, radar device 1400 may include a scheduling controller 1402 configured to schedule radar transmissions of the radar device 1400, e.g., as described below. For example, radar processor 834 (FIG. 8), controller 950 (FIG. 9) and/or MPU 1010 (FIG. 10) may include one or more elements of, and/or may be configured to perform one or more functionalities and/or operations of, scheduling controller 1402.

In some demonstrative aspects, scheduling controller 1402 may include a scheduler 1404 configured to determine scheduling information 1411 to schedule radar transmissions of radar device 1400 during a sequence of radar frames, e.g., as described below.

In some demonstrative aspects, scheduler 1404 may include, or may be implemented, partially or entirely, by circuitry and/or logic, e.g., one or more processors including circuitry and/or logic, memory circuitry and/or logic. Additionally or alternatively, one or more functionalities of scheduler 1404 may be implemented by logic, which may be executed by a machine and/or one or more processors, e.g., as described below.

In some demonstrative aspects, scheduler 1404 may be configured to determine a burst-based frame setting to schedule a sequence of radar burst transmissions during a radar frame of the sequence of radar frames, e.g., as described below.

In some demonstrative aspects, the sequence of radar burst transmissions may include, for example, a repetitive sequence of identical radar burst transmissions separated by a constant burst gap, e.g., as described below.

In other aspects, the sequence of radar burst transmissions may include any other sequence of transmissions separated by the burst gap.

In some demonstrative aspects, the burst-based frame setting may include a setting of a burst gap duration, e.g., as described below.

In some demonstrative aspects, the burst gap duration may include a duration of a burst gap between first and second consecutive radar burst transmissions of the sequence of radar burst transmissions, e.g., as described below.

In some demonstrative aspects, the burst-based frame setting may include, for example, a setting of a burst transmission duration. For example, the burst transmission duration may include a duration of a radar burst transmission of the sequence of radar burst transmissions.

In some demonstrative aspects, the burst-based frame setting may include, for example, a setting of a burst transmission bandwidth. For example, the burst transmission bandwidth may include a frequency bandwidth of the radar burst transmission.

In some demonstrative aspects, the burst-based frame setting may include, for example, a setting of a burst transmission count. For example, the burst transmission count may include a count of radar burst transmissions in the sequence of radar burst transmissions.

In other aspects, the burst-based frame setting may include, for example, a setting of any other additional or alternative setting to schedule the sequence of radar burst transmissions during the radar frame.

In some demonstrative aspects, scheduling controller 1402 may include an output 1406 to provide an output 1413 based on the scheduling information 1411, e.g., as described below.

In some demonstrative aspects, the output 1413 may include the scheduling information 1411, e.g., as described below.

In some demonstrative aspects, the output 1413 may include transmission information to configure the radar transmissions according to the scheduling information 1411, e.g., as described below.

In some demonstrative aspects, radar device 1400 may include a controller 1408, which may be configured to control the radar transmissions of the radar device 1400, for example, according to the scheduling information 1411, e.g., based on the output 1413. For example, radar processor 834 (FIG. 8), controller 950 (FIG. 9) and/or may MPU 1010 (FIG. 10) may include one or more elements of, and/or may be configured to perform one or more functionalities and/or operations of, controller 1408.

In some demonstrative aspects, controller 1408 may be configured to change one or more radar signal parameters during a burst gap, e.g., between consecutive burst transmissions, e.g., as described below.

In some demonstrative aspects, scheduler 1404 may be configured to set the burst gap duration based on a memory size of the memory 1430 to store received signals of the radar transmissions, for example, at Rx FE 1426, e.g., as described below.

In some demonstrative aspects, scheduler 1404 may be configured to set the burst gap duration based, for example, on a sampling rate of received radar signals Rx FE 1426, e.g., a sampling rate of ADC 1429, e.g., as described below.

In some demonstrative aspects, scheduler 1404 may be configured to set the burst gap duration based, for example, on a bandwidth of the interface 1428 between Rx FE 1426 and radar processor 1410, e.g., as described below.

In some demonstrative aspects, scheduler 1404 may be configured to set the burst gap duration based, for example, on a rate to provide the radar signal information from the memory 1430 to the radar processor 1410, e.g., via interface 1428.

In some demonstrative aspects, scheduler 1404 may be configured to determine the burst-based frame setting to schedule the sequence of radar burst transmissions during the radar frame, for example, based on a mode of operation of radar device 1400 and/or radar processor 1410, e.g., as described below.

In some demonstrative aspects, scheduler 1404 may be configured to determine the burst-based frame setting to schedule the sequence of radar burst transmissions, for example, based on mode of operation information, e.g., from radar processor 1410, e.g., as described below.

In some demonstrative aspects, scheduler 1404 may be configured to identify one or more KPIs and/or requirements of a mode of operation of radar processor 1410, for example, based on the mode of operation information, e.g., from radar processor 1410.

In some demonstrative aspects, scheduler 1404 may be configured to determine the burst-based frame setting to schedule the sequence of radar burst transmissions, for example, based on the one or more KPIs and/or requirements of a mode of operation of radar processor 1410, e.g., as described below.

In some demonstrative aspects, scheduler 1404 may be configured to determine a first burst-based frame setting to schedule the sequence of radar burst transmissions, for example, based on identifying one or more KPIs and/or requirements of a first mode of operation of radar processor 1410, e.g., as described below.

In some demonstrative aspects, scheduler 1404 may be configured to switch from the first burst-based frame setting to a second burst-based frame setting, for example, based on identifying one or more KPIs and/or requirements of a second mode of operation of radar processor 1410, e.g., as described below.

In one example, the first mode of operation of radar processor 1410 may correspond to a first integration time and/o SNR level, and the second mode of operation of radar processor 1410 may correspond to a second integration time and/o SNR level, e.g., as described below.

In another example, the first mode of operation of radar processor 1410 may correspond to a first range resolution and/or velocity resolution, and the second mode of operation of radar processor 1410 may correspond to a second range resolution and/or velocity resolution, e.g., as described below.

In some demonstrative aspects, scheduler 1404 may be configured to determine the burst-based frame setting to schedule the sequence of radar burst transmissions during the radar frame, for example, based on at least one radar performance parameter of the radar device 1400, e.g., as described below.

In some demonstrative aspects, scheduler 1404 may be configured to determine a first burst-based frame setting based on a first setting of the radar performance parameter, e.g., as described below.

In some demonstrative aspects, scheduler 1404 may be configured to determine a second burst-based frame setting based on a second setting of the radar performance parameter, e.g., as described below.

In some demonstrative aspects, the first setting of the radar performance parameter may be different from the second setting of the radar performance parameter, e.g., as described below.

In some demonstrative aspects, the first burst-based frame setting may be different from the second burst-based frame setting, e.g., as described below.

In some demonstrative aspects, the first burst-based frame setting may include a first burst gap duration, and/or the second burst-based frame setting may include a second burst gap duration, e.g., different from the first burst gap duration.

In some demonstrative aspects, the first setting of the radar performance parameter may include a first Signal to Noise Ratio (SNR), and the first burst-based frame setting may include a first burst gap duration, e.g., corresponding to the first SNR.

In some demonstrative aspects, the second setting of the radar performance parameter may include a second, and the second burst-based frame setting may include a second burst gap duration, e.g., corresponding to the second SNR.

In some demonstrative aspects, the second SNR may be, for example, greater than the first SNR.

In some demonstrative aspects, the second burst gap duration corresponding to the second SNR may be, for example, longer than the first burst gap duration corresponding to the first SNR.

In some demonstrative aspects, the first setting of the radar performance parameter may include a first range resolution level, and the first burst-based frame setting may include a first burst gap duration, e.g., corresponding to the first range resolution level.

In some demonstrative aspects, the second setting of the radar performance parameter may include a second range resolution level, and the second burst-based frame setting may include a second burst gap duration, e.g., corresponding to the second range resolution level.

In some demonstrative aspects, the second range resolution level may be, for example, greater than the first range resolution level.

In some demonstrative aspects, the second burst gap duration corresponding to the second range resolution level may be, for example, longer than the first burst gap duration corresponding to the first range resolution level.

In some demonstrative aspects, the first setting of the radar performance parameter may include a first velocity resolution level, and the first burst-based frame setting may include a first burst gap duration, e.g., corresponding to the first velocity resolution level.

In some demonstrative aspects, the second setting of the radar performance parameter may include a second velocity resolution level, and the second burst-based frame setting may include a second burst gap duration, e.g., corresponding to the second velocity resolution level.

In some demonstrative aspects, the second velocity resolution level may be, for example, greater than the first velocity resolution level.

In some demonstrative aspects, second burst gap duration corresponding to the second velocity resolution level may be, for example, longer than the first burst gap duration corresponding to the first velocity resolution level.

In some demonstrative aspects, the first burst-based frame setting may include a first value of a burst transmission count, and the second burst-based frame setting may include a second value of the burst transmission count, e.g., as described below.

In some demonstrative aspects, the burst transmission count may include a count of radar burst transmissions in the sequence of radar burst transmissions, e.g., as described below.

In some demonstrative aspects, the second value of the burst transmission count may be, for example, greater than the first value of the burst transmission count.

In other aspects, the scheduler 1404 may be configured to determine any other additional or alternative burst-based frame setting to schedule the sequence of radar burst transmissions during the radar frame, for example, based on any of radar performance parameters described above, and/or any other additional or alternative performance parameter of the radar device 1400.

In some demonstrative aspects, scheduler 1404 may be configured to adjust, e.g., to dynamically adjust, the burst-based frame setting to schedule the sequence of radar burst transmissions during the radar frame, for example, based on a change in the radar performance parameter of the radar device 1400.

Reference is made to FIG. 15, which schematically illustrates a radar scheduling and processing scheme 1500, in accordance with some demonstrative aspects. For example, scheduler 1404 (FIG. 14) may be configured to schedule transmission of radar transmissions during a sequence of radar frames, for example, according to the radar scheduling and processing scheme 1500.

In some demonstrative aspects, a radar device, e.g., radar device 800 (FIG. 8) radar device 910 (FIG. 9), and/or radar device 1400 (FIG. 14), may be configured to communicate and/or process radar signals according to the radar scheduling and processing scheme of FIG. 15, for example, at a burst mode.

In some demonstrative aspects, as shown in FIG. 15, a scheduler, e.g., scheduler 1404 (FIG. 14), may be configured to schedule a sequence of radar burst transmissions 1502 (chirps) during a radar frame of a sequence of radar frames, for example, at a burst mode of operation.

In some demonstrative aspects, as shown in FIG. 15, the scheduler, e.g., scheduler 1404 (FIG. 14), may be configured to determine a setting of a burst gap duration 1504 between first and second consecutive radar burst transmissions 1502.

In some demonstrative aspects, as shown in FIG. 15, the burst mode may be configured to space the chirps 1502 within the frame, for example, to provide gaps 1504 between consecutive chirp transmissions.

In some demonstrative aspects, as shown in FIG. 15, the gaps 1504 between the chirps 1502 within the frame may be configured, for example, to support use of an interface 1512, e.g., a high speed interface, to evacuate a memory, e.g., memory 1430 (FIG. 14), for example, between chirps 1502.

In some demonstrative aspects, as shown in FIG. 15, the memory, e.g., a RAM, may store data of a chirp 1502. For example, as shown in FIG. 15, the gap 1504 between the chirp 1502 and a next chirp 1502 may be sufficient for the high speed interface 1512 to evacuate the data from the RAM and transfer the data for processing by a processing unit 1514.

In some demonstrative aspects, as shown in FIG. 15, the gap 1504 between the consecutive chirps 1502 may be long enough to allow a sufficient amount of data to be evacuated (1519) from the memory, for example, such that the memory may be able to store data from the next chirp 1502.

In some demonstrative aspects, in one implementation, a burst, e.g., each burst, may include a single chirp, e.g., as shown in FIG. 15. In other aspects, for some cases, several chirps may be included in a burst, e.g., in each burst. For example, the number of chirps per burst may be determined, for example, depending on Doppler processing methods and/or any other criteria implemented by a radar device.

In some demonstrative aspects, for example, for a Doppler FFT processing, a phase continuity and optional compensation may be implemented, e.g., as described below.

In some demonstrative aspects, an imaging radar device, e.g., radar device 800 (FIG. 8) and/or radar device 910 (FIG. 9), may be configured to utilize the spacing 1504 of the chirps 1502, e.g., as shown in FIG. 15, to efficiently and/or easily process the entire frame, e.g., as described below.

In some demonstrative aspects, the parameters of radar extract may include extracting the chirps initial phase representing the added frequency due to the doppler effect, e.g., which may later be translated to velocity.

In some demonstrative aspects, a doppler processing method, for example, an FFT method or any other method, may be implemented, for example, to maintain a simple system and/or low compute complexity.

In some demonstrative aspects, equally-spaced periods of sampling of the Doppler phase may be used, for example, to support FFT processing. For example, this may be continuous, e.g., when using a single chirp in each burst, or sparse, e.g., if several chirps are used in each burst.

In some demonstrative aspects, an extension of a system clock scheme, e.g., an extension of an entire system clock scheme and/or synch with the RF domain, may be implemented, for example, to achieve coherent bursts form a sampling perspective, e.g., as described below.

Figure 16:
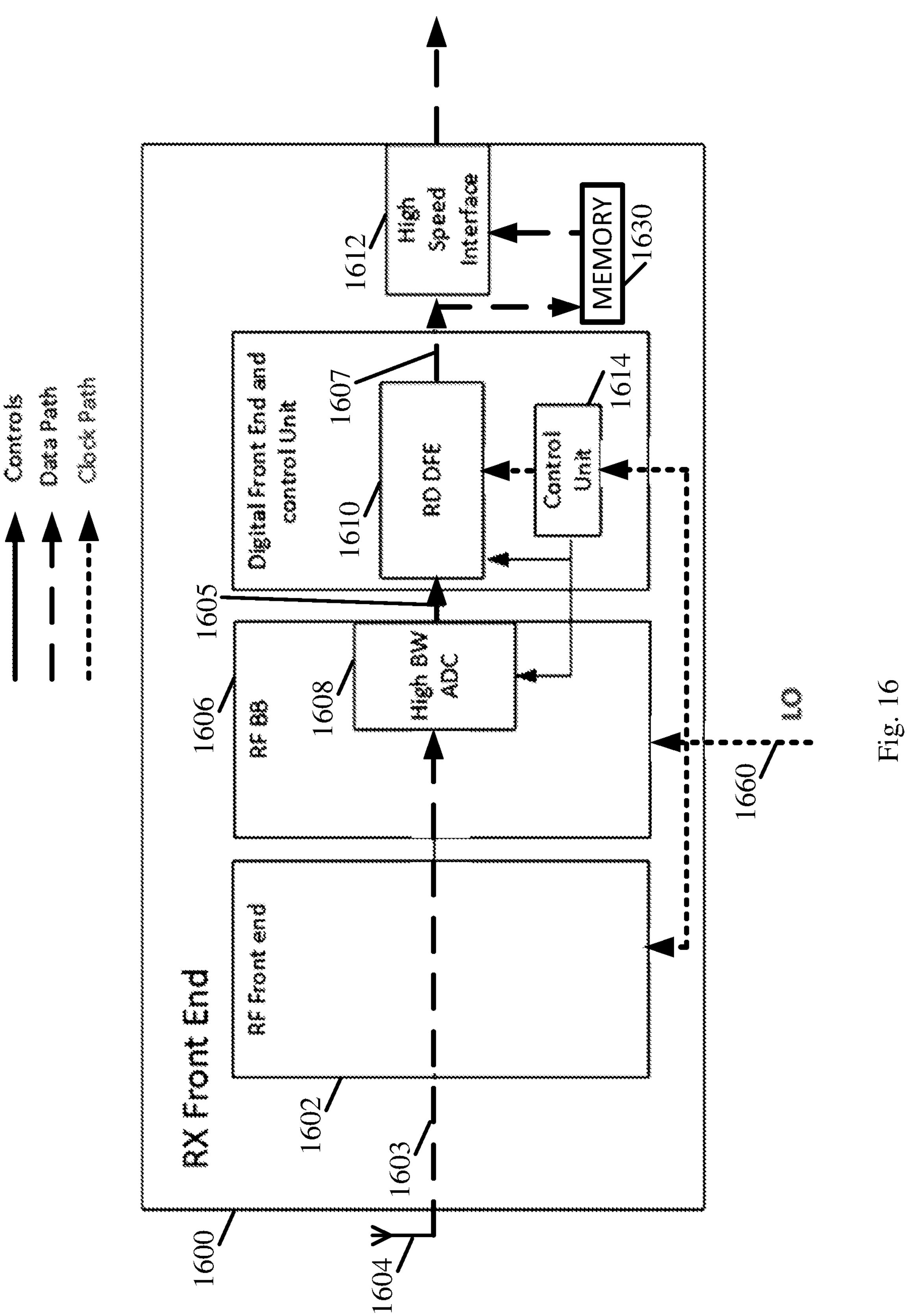
FIG. 16 is a schematic illustration of a radar receive (Rx) processing scheme of an Rx Front End (FE), in accordance with some demonstrative aspects.

Reference is made to FIG. 16, which schematically illustrates a radar Rx processing scheme of an Rx FE 1600, in accordance with some demonstrative aspects. For example, an Rx front end 1006 (FIG. 10) may include one or more elements of, and/or may be configured to perform one or more functionalities and/or operations of, the radar Rx FE 1600.

In some demonstrative aspects, radar device 800 (FIG. 8) and/or radar device 910 (FIG. 9) may include one or more elements of, and/or may be configured to perform one or more functionalities and/or operations of, the radar Rx processing scheme of FIG. 16.

In some demonstrative aspects, Rx FE 1600 may include an RF FE 1602 configured to receive and/or process radar Rx RF signals 1603, which may be received via one or more Rx antennas 1604. For example, RF FE 1602 may include a plurality of Rx chains configured to receive and process the radar Rx RF signals received via a plurality of Rx antennas 1604. For example, RF FE 1602 may include one or more elements of, and/or may be configured to perform one or more functionalities and/or operations of, receiver 885 (FIG. 8) and/or RFICs 920 (FIG. 9).

In some demonstrative aspects, Rx FE 1600 may include an RF Baseband (BB) 1106 configured to perform BB processing of the Rx RF signals 1603. For example, RF BB 1606 may include an ADC, for example, a high BW ADC 1608, which may be configured to provide digital signals 1605 based on the Rx RF signals 1603 processed by RF BB 1606.

In some demonstrative aspects, Rx FE 1600 may include a digital FE (DFE) 1610, which may be configured to perform digital processing of the digital signals 1605 and to provide digital Rx information 1607 based on the digital signals 1605.

For example, BB processor 930 (FIG. 9) may include one or more elements of, and/or may be configured to perform one or more functionalities and/or operations of, RF BB 1606 and/or DFE 1610.

In some demonstrative aspects, Rx FE 1600 may include a communication interface 1612, for example, a high speed interface, to communicate the digital Rx information 1607, for example, to a radar processor, e.g., to an MPU.

In some demonstrative aspects, Rx FE 1600 may include a memory 1630 to store the digital Rx information 1607, for example, to temporarily store the digital Rx information 1607, e.g., until transmission by the communication interface 1612.

In some demonstrative aspects, Rx FE 1600 may include a controller 1614 configured to control one or more operations and/or functionalities of Rx FR 1600.

In some demonstrative aspects, as shown in FIG. 16, one or more elements and/or functionalities of RF FE 1600 may be driven according to a Local Oscillator (LO) signal 1660, e.g., in a millimeter-wave (mmW) domain.

In some demonstrative aspects, as shown in FIG. 16, the LO signal 1660, which drives the RF FE 1602, may also be used, e.g., divided, to drive the BB domain, e.g., at RF BB 1606 and/or DFE 1610.

In some demonstrative aspects, for example, as shown in FIG. 16, a branch of LO signal 1660 may be used to drive an entire digital front end 1610, which may be responsible to time the ADC 1608, for example, at the recording and gaps 1504 (FIG. 15) between bursts 1502 (FIG. 15).

In some demonstrative aspects, the radar Rx processing scheme of FIG. 16 may be configured to time the entire Rx path, for example, with the LO phase. This solution may be implemented, e.g., regardless of whether bursts are used or not. As a result, even if bursts are used, the coherency of the phase may be maintained, for example, in a way which may allow the Doppler processing to remain simple, e.g., using FFT or any other processing methods.

In some demonstrative aspects, a radar burst mode, e.g., as described above, may provide a technical advantage, for example, in terms of KPI, e.g., as described below.

In some demonstrative aspects, one or more attributes of a radar system may be determined, for example, according to the following calculation:

(1) An effective interface rate per channel in the radar system may be defined, e.g., as follows:

$$a.\ \text{EFF\_Int\_CH} = [\text{High Speed Interface}] * 1000/(CHs * \text{ADC\_BITS})$$

wherein:

i. CHs—denotes # of channels in each RF chips front end, e.g., a few channels for efficiency;

ii. High Speed Interface—denotes an effective (e.g., after protocol overhead) rate to transfer the ADC output;

iii. ADC_BITS—denotes a number of bits to sample the chirp (sample size for the processing unit).

(2) A peak MEM after a single chirp may be defined, e.g., as follows:

$$a.\ \text{PEAK\_MEM\_CHIRP} = \text{T\_REC} * \text{BW\_GAP} * \text{ADC\_BITS}$$

wherein:

i. BW_GAP=CHIRP_BW−EFF_Int_CH—denotes the Chirp BW used in the radar system;

ii. T_REC—denotes a recording time of the chirp.

(3) Leftover data in the memory at the end of the chirp may be defined, e.g., as follows:

$$a.\ \text{MEM\_END\_CHIRP} = \text{PEAK\_MEM\_CHIRP} - ((\text{PRI} - \text{T\_REC}) * \text{EFF\_SER\_CH} * \text{ADC\_BITS})$$

wherein:

i. PRI—denotes a period interval between chirps.

(4) A total required memory needed for the frame for a single channel, e.g., for a given High Speed Interface's Rate, may be defined, e.g., as follows:

$$a.\ \text{TOT\_MEM\_CH} = \text{MEM\_END\_CHIRP} * (CHIRPs - 1) + \text{PEAK\_MEM\_CHIRP}$$

wherein:

i. CHIRPS—denotes a number of chirps in the Frame.

In some demonstrative aspects, according to the above calculation definitions it may be shown that for chirps with a bandwidth of about 200 Mhz, a memory size of about 1 MB SRAM may be added, e.g., for each channel, for example, in order to support a continuous radar mode, for example, using bout 128 chirps per radar frame, e.g., for a system configuration of a PRI of about 40 us, and a frame duration of about 5 ms.

In some demonstrative aspects, according to the above calculation definitions it may be shown that for an increased BW, e.g., a BW of about 1 Ghz, while keeping the same SRAM size in the continuous radar mode, the frame integration will be reduced by a factor of about 10. This reduction may severely impact the SNR (e.g., about 10 dB less SNR), and/or may result in a speed-resolution reduction by a similar factor, e.g., as only a tenth of the number of chirps may now be available.

In some demonstrative aspects, a radar scheduling scheme utilizing the burst mode, e.g., as described above, may be implemented to provide a technical solution to improve, e.g., optimize, one or more system parameters, for example, to achieve higher SNR.

For example, with similar system parameters, it can be shown, e.g., according to the above calculation definitions, that an increased integration time may be achieved in the burst mode, e.g., compared to the continuous mode. In one example, the burst mode may achieve in increase in the integration time, e.g., with an impact of an increase of about 6 dB, and/or an increase in the speed resolution, for example, by a factor of ×4, e.g., compared to the continues mode. In other aspects, different results may be achieved.

For example, from an overall system performance perspective, although there may be some sacrifice, e.g., in terms of Vmax (×5 factor), high BW chirps nay be used in high BW frames, for example, for relatively closer ranges. In such cases, relatively simple algorithms may be implemented to solve a potential velocity ambiguity, e.g., given the relatively high SNR KPI.

In some demonstrative aspects, the burst mode frame structure, e.g., as described herein, may be implemented to provide a technical solution to support intra-frame diversity, e.g., as described below.

In some demonstrative aspects, the burst mode frame structure, e.g., as described herein, may be implemented to provide a technical solution to support a non-periodic frame scheme, which may include changes in the configuration of the radar signals transmitted within the same frame, e.g., as described below.

In some demonstrative aspects, intra-frame diversity may be achieved, for example, by changing one or more parameters, e.g., the waveform, one or more of the waveform's parameters, and/or any other parameters of the radar signals, for example, between bursts of the same frame.

In some demonstrative aspects, the gaps between bursts, e.g., gaps 1504 (FIG. 15), may be configured to support changes of HW parameters, e.g., between bursts.

In some demonstrative aspects, the gaps between bursts, e.g., gaps 1504 (FIG. 15), may be configured to support communication of information, e.g., HW changes and/or control commands, to be delivered and be in effect before the next burst is transmitted.

In some demonstrative aspects, one or more changes between bursts may be applied in some cases to Tx only, Rx only, or in coordination to both the Tx and Rx parts of the underling HW.

In one example, an implementation of a frequency stepping functionality may be applied, e.g., to a CTDMA radar, or any other implementation.

In another example, a waveform polarization of the radar signals may be changed between bursts.

In other aspects, any other parameters and/or attributes may be changed between some or all of the bursts.

Figure 17:
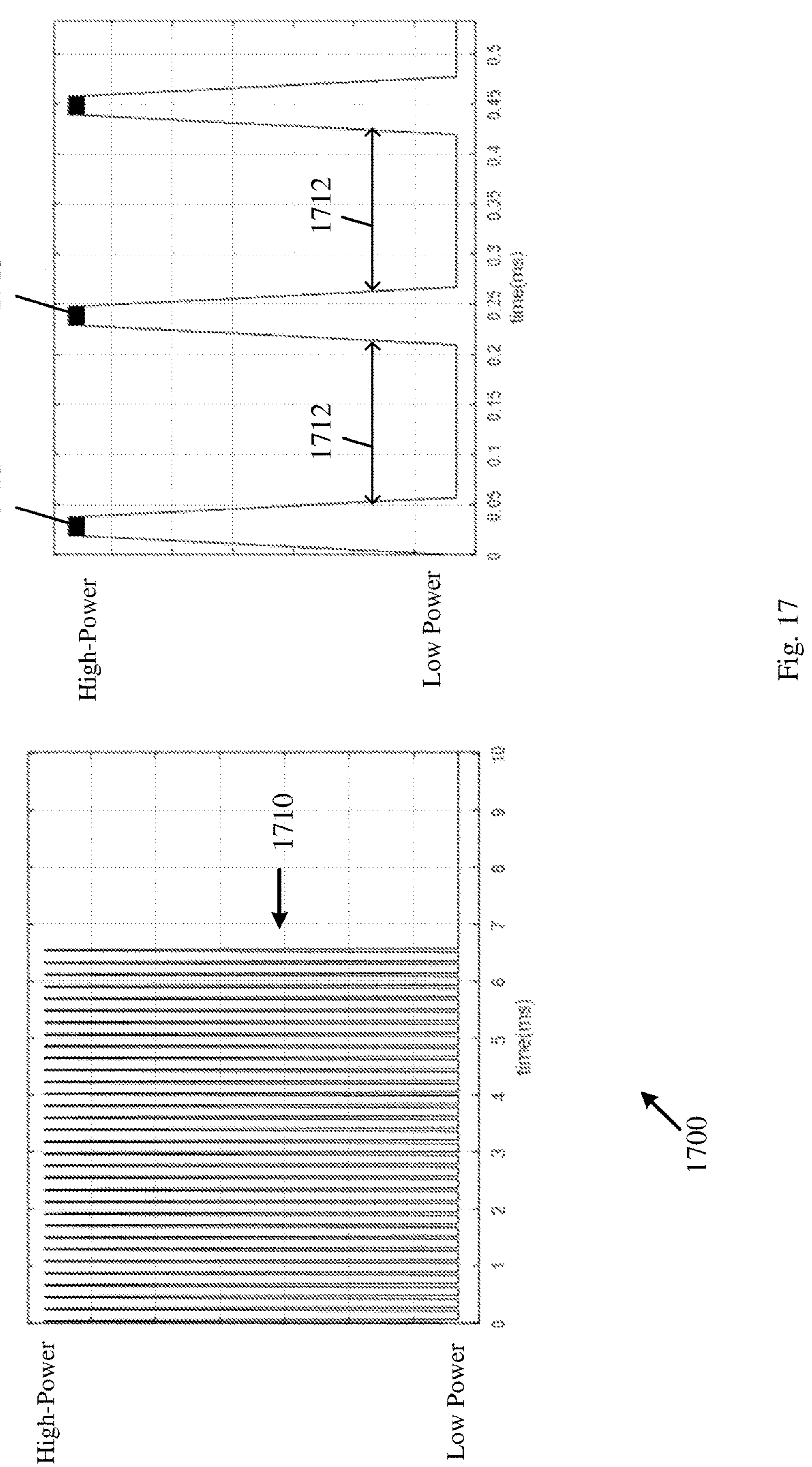
FIG. 17 is a schematic illustration of a structure of a radar frame, which may be implemented in accordance with some demonstrative aspects.

Reference is made to FIG. 17, which schematically illustrates a structure of a radar frame 1700, which may be implemented in accordance with some demonstrative aspects.

In some demonstrative aspects, as shown in FIG. 17, radar frame 1700 may include a burst-mode radar frame including a sequence of burst transmissions 1710, which may be transmitted by a radar device, e.g., radar device 800 (FIG. 9), and/or radar device 910 (FIG. 9).

In one example, a controller and/or scheduler, for example scheduler 1404 (FIG. 14), e.g., implemented by processor 834 (FIG. 8) and/or controller 950 (FIG. 9), may be configured to control a radar device, e.g., radar device 800 (FIG. 8), radar device 910 (FIG. 9), and/or radar device 1400 (FIG. 14), to communicate radar signals according to the radar frame 1700.

In one example, the sequence of burst transmissions 1710 may be defined as a subset of pulses of radar frame 1700, e.g., which may be transmitted continuously.

In one example, a burst transmission (pulse) in the sequence of burst transmissions 1710 may include a chirp signal, a phase modulated signal, an OFDM signal, and/or any other signal.

In some demonstrative aspects, as shown in FIG. 17, the sequence of burst transmissions 1710 may be separated by a plurality of burst gaps 1712.

In one example, there may be a burst gap 1712 between a first burst transmission 1711 and a second burst transmission 1713, which may be consecutive to the first burst transmission 1711 in the sequence of burst transmissions 1710.

In some demonstrative aspects, as shown in FIG. 17, the burst gap 1712 may be configured to be long enough, for example, to allow to compensate a time delay for digital radar processing of the sequence of burst transmissions 1710.

In some demonstrative aspects, as shown in FIG. 17, the radar burst transmissions 1710 of radar frame 1700 may be configured, for example, according to a comb-like structure defining a repetitive sequence of identical radar bursts separated by a constant burst gap, e.g., as described below.

In some demonstrative aspects, as shown in FIG. 17, the radar burst transmissions 1710 of radar frame 1700 may be configured according to a sparse comb-like structure. For example, the sparse comb-like structure of radar frame 1700 may include built-in gaps 1712, which may be configured to allow a radar device, e.g., radar device 800 (FIG. 8) and/or radar device 1400 (FIG. 14), to "clean up" the memory buffer, for example, before new data arrives, e.g., as described above.

In some demonstrative aspects, a radar burst in the sequence of burst transmissions 1710 may have a burst duration, which may be, for example, less than 1000 microseconds (us). In other aspects, any other burst duration may be implemented.

In some demonstrative aspects, as shown in FIG. 17, consecutive radar bursts in the sequence of burst transmissions 1710, e.g., radar bursts 1711 and 1713, may be separated by a burst gap, e.g., of about 0.15 milliseconds (ms). In other aspects, any other burst gap may be implemented.

Figure 18:
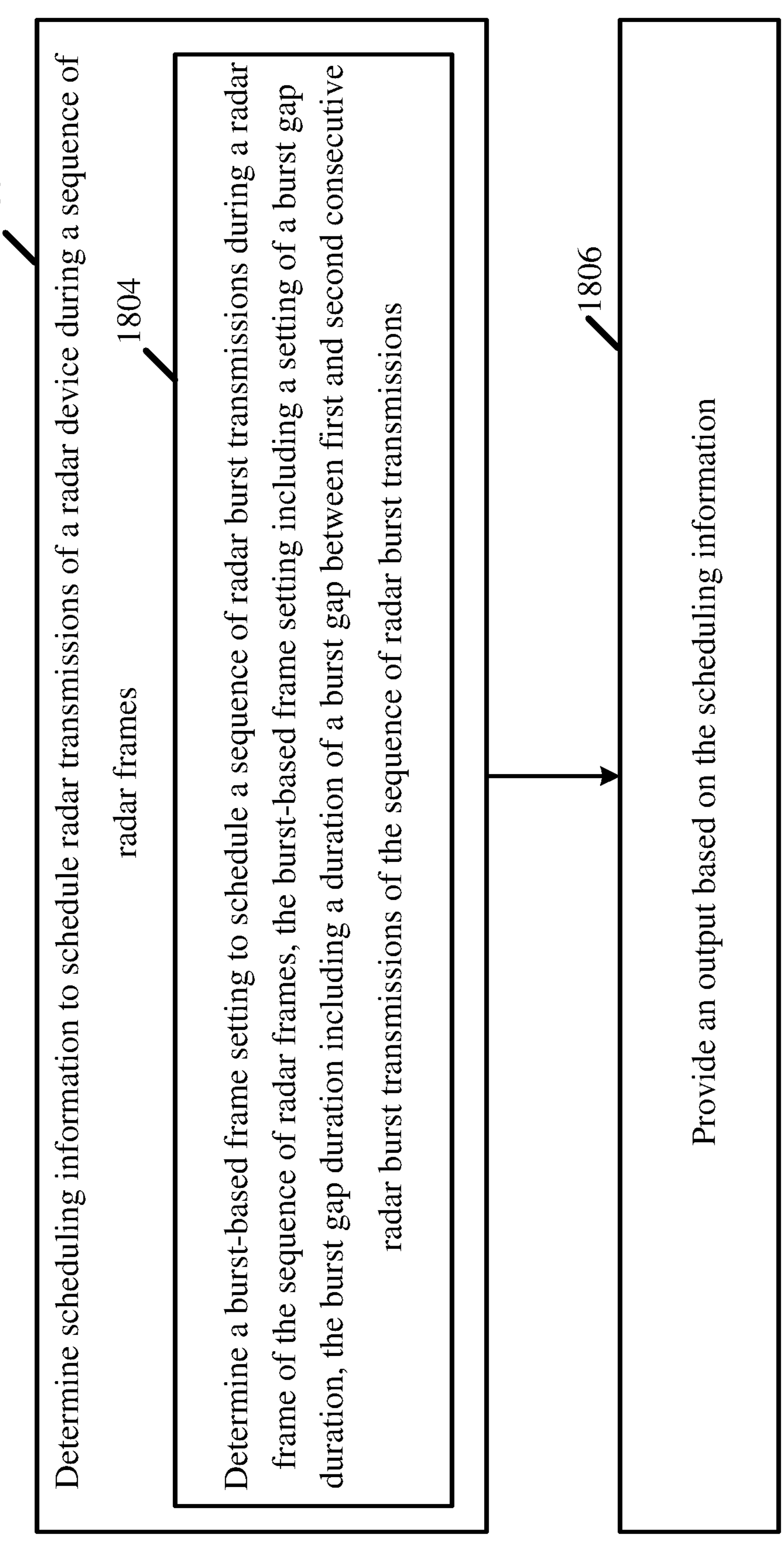
FIG. 18 is a schematic flow chart illustration of a method of scheduling radar transmissions, in accordance with some demonstrative aspects.

Reference is made to FIG. 18, which schematically illustrates a method of scheduling radar transmissions, in accordance with some demonstrative aspects. For example, one or more of the operations of the method of FIG. 18 may be performed by a radar system, e.g., radar system 900 (FIG. 9); a radar device, e.g., radar device 800 (FIG. 8), radar device 910 (FIG. 9), and/or radar device 1400 (FIG. 11); and/or a scheduler, e.g., scheduling controller 1402 (FIG. 14).

As indicated at block 1802, the method may include determining scheduling information to schedule radar transmissions of a radar device during a sequence of radar frames. For example, scheduler 1404 (FIG. 14) may be configured to determine scheduling information 1411 (FIG. 14) to schedule radar transmissions of radar device 1400 (FIG. 14) during a sequence of radar frames, e.g., as described above.

In some demonstrative aspects, as indicated at block 1804, determining the scheduling information may include determining a burst-based frame setting to schedule a sequence of radar burst transmissions during a radar frame of the sequence of radar frames, the burst-based frame setting including a setting of a burst gap duration, the burst gap duration including a duration of a burst gap between first and second consecutive radar burst transmissions of the sequence of radar burst transmissions. For example, scheduler 1404 (FIG. 14) may be configured to determine the burst-based frame setting to schedule the sequence of radar burst transmissions during the radar frame, as described above.

As indicated at block 1806, the method may include providing an output based on the scheduling information. For example, scheduling controller 1402 (FIG. 14) may be configured to provide the output 1413 (FIG. 14), for example, based on the scheduling information 1411 (FIG. 14), as described above.

Figure 19:
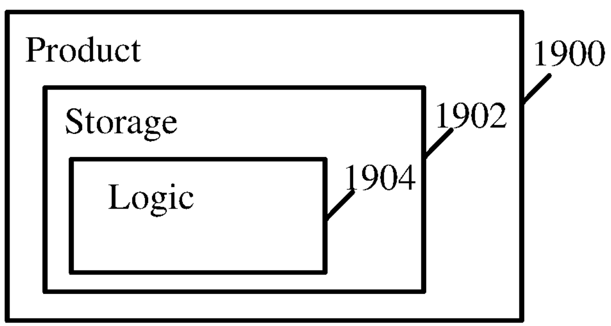
FIG. 19 is a schematic illustration of a product of manufacture, in accordance with some demonstrative aspects.

Reference is made to FIG. 19, which schematically illustrates a product of manufacture 1900, in accordance with some demonstrative aspects. Product 1900 may include one or more tangible computer-readable ("machine-readable") non-transitory storage media 1902, which may include instructions, for example, computer-executable instructions and/or any other instructions, e.g., implemented by logic 1904, operable to, when executed by at least one computer processor, enable the at least one computer processor to implement one or more operations and/or functionalities operations at one or more of the devices and/or elements described with reference to any of FIGS. 1-18, to perform, trigger and/or implement one or more operations and/or functionalities, and/or to perform, trigger and/or implement one or more operations and/or functionalities described with reference to any of FIGS. 1-18, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1900 and/or machine-readable storage media 1902 may include one or more types of computer-readable storage media capable of storing data, including volatile memory, non-volatile memory, removable or non-removable memory, erasable or non-erasable memory, writeable or re-writeable memory, and the like. For example, machine-readable storage media 1902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising a scheduler configured to determine scheduling information to schedule radar transmissions of a radar device during a sequence of radar frames, wherein the scheduler is configured to determine a burst-based frame setting to schedule a sequence of radar burst transmissions during a radar frame of the sequence of radar frames, the burst-based frame setting comprising a setting of a burst gap duration, the burst gap duration comprising a duration of a burst gap between first and second consecutive radar burst transmissions of the sequence of radar burst transmissions; and an output to provide an output based on the scheduling information.

Example 2 includes the subject matter of Example 1, and optionally, wherein the scheduler is configured to set the burst gap duration based on a memory size of a memory to store received signals of the radar transmissions.

Example 3 includes the subject matter of Example 1 or 2, and optionally, wherein the scheduler is configured to set the burst gap duration based on a sampling rate of received radar signals at a Radio-Frequency (RF) frontend of the radar device, and based on a bandwidth of an interface between the RF frontend and a radar processor.

Example 4 includes the subject matter of any one of Examples 1-3, and optionally, wherein the scheduler is configured to set the burst gap duration based on a rate to provide radar signal information from a memory of the radar device to a radar processor, wherein the radar signal information is based on received signals of the radar transmissions.

Example 5 includes the subject matter of any one of Examples 1-4, and optionally, wherein the scheduler is configured to determine the burst-based frame setting based on at least one radar performance parameter of the radar device.

Example 6 includes the subject matter of any one of Examples 1-5, and optionally, wherein the scheduler is configured to determine a first burst-based frame setting based on a first setting of the radar performance parameter, and to determine a second burst-based frame setting based on a second setting of the radar performance parameter, wherein the first setting of the radar performance parameter is different from the second setting of the radar performance parameter, and the first burst-based frame setting is different from the second burst-based frame setting.

Example 7 includes the subject matter of Example 6, and optionally, wherein the first burst-based frame setting comprises a first burst gap duration, and the second burst-based frame setting comprises a second burst gap duration different from the first burst gap duration.

Example 8 includes the subject matter of Example 6 or 7, and optionally, wherein the first setting of the radar performance parameter comprises a first Signal to Noise Ratio (SNR), and the second setting of the radar performance parameter comprises a second SNR greater than the first SNR, wherein the first burst-based frame setting comprises a first burst gap duration, and the second burst-based frame setting comprises a second burst gap duration longer than the first burst gap duration.

Example 9 includes the subject matter of any one of Examples 6-8, and optionally, wherein the first setting of the radar performance parameter comprises a first range resolution level, and the second setting of the radar performance parameter comprises a second range resolution level greater than the first range resolution level, wherein the first burst-based frame setting comprises a first burst gap duration, and the second burst-based frame setting comprises a second burst gap duration longer than the first burst gap duration.

Example 10 includes the subject matter of any one of Examples 6-9, and optionally, wherein the first setting of the radar performance parameter comprises a first velocity resolution level, and the second setting of the radar performance parameter comprises a second velocity resolution level greater than the first velocity resolution level, wherein the first burst-based frame setting comprises a first burst gap duration, and the second burst-based frame setting comprises a second burst gap duration longer than the first burst gap duration.

Example 11 includes the subject matter of any one of Examples 6-10, and optionally, wherein the first burst-based frame setting comprises a first value of a burst transmission count, and the second burst-based frame setting comprises a second value of the burst transmission count, the burst transmission count comprising a count of radar burst transmissions in the sequence of radar burst transmissions, wherein the second value of the burst transmission count is greater than the first value of the burst transmission count.

Example 12 includes the subject matter of any one of Examples 5-11, and optionally, wherein the scheduler is configured to adjust, e.g., dynamically adjust, the burst-based frame setting based on a change in the radar performance parameter of the radar device.

Example 13 includes the subject matter of any one of Examples 1-12, and optionally, wherein the burst-based frame setting comprises a setting of at least one of a burst transmission duration, a burst transmission bandwidth, or a burst transmission count, wherein the burst transmission duration comprises a duration of a radar burst transmission of the sequence of radar burst transmissions, the burst transmission bandwidth comprises a frequency bandwidth of the radar burst transmission, the burst transmission count comprises a count of radar burst transmissions in the sequence of radar burst transmissions.

Example 14 includes the subject matter of any one of Examples 1-13, and optionally, wherein the sequence of radar burst transmissions comprises a repetitive sequence of identical radar burst transmissions separated by a constant burst gap.

Example 15 includes the subject matter of any one of Examples 1-14, and optionally, comprising a controller configured to control the radar transmissions of the radar device according to the scheduling information, wherein the controller is configured to change one or more radar signal parameters between the first and second consecutive burst transmissions.

Example 16 includes the subject matter of any one of Examples 1-15, and optionally, wherein the output comprises the scheduling information.

Example 17 includes the subject matter of any one of Examples 1-15, and optionally, wherein the output comprises transmission information to configure the radar transmissions according to the scheduling information.

Example 18 includes the subject matter of any one of Examples 1-17, and optionally, comprising a radar processor configured to generate radar information based on radar data, the radar data based on the radar transmissions.

Example 19 includes the subject matter of Example 18, and optionally, comprising a vehicle, the vehicle comprising a system controller to control one or more systems of the vehicle based on the radar information.

Example 20 includes a vehicle comprising the apparatus of any of Examples 1-19.

Example 21 includes an apparatus comprising means for executing any of the described operations of any of Examples 1-19.

Example 22 includes a machine-readable medium that stores instructions for execution by a processor to perform any of the described operations of any of Examples 1-19.

Example 23 comprises a product comprising one or more tangible computer-readable non-transitory storage media comprising instructions, e.g., computer-executable instructions, operable to, when executed by at least one processor, enable the at least one processor to cause a device to perform any of the described operations of any of Examples 1-19.

Example 24 includes an apparatus comprising a memory; and processing circuitry configured to perform any of the described operations of any of Examples 1-19.

Example 25 includes a method including any of the described operations of any of Examples 1-19.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

a scheduler configured to determine scheduling information to schedule radar transmissions of a radar device during a sequence of radar frames, wherein the scheduler is configured to determine a burst-based frame setting to schedule a sequence of radar burst transmissions during a radar frame of the sequence of radar frames, the burst-based frame setting comprising a setting of a burst gap duration, the burst gap duration comprising a duration of a burst gap between first and second consecutive radar burst transmissions of the sequence of radar burst transmissions, wherein the burst gap is in a low-power state relative to a power state of the sequence of radar burst transmissions; and an output to provide an output based on the scheduling information to cause the radar device to transmit the sequence of radar burst transmissions.

2. The apparatus of claim 1, wherein the scheduler is configured to set the burst gap duration based on a memory size of a memory to store received signals of the radar transmissions.

3. The apparatus of claim 1, wherein the scheduler is configured to set the burst gap duration based on a sampling rate of received radar signals at a Radio-Frequency (RF) frontend of the radar device, and based on a bandwidth of an interface between the RF frontend and a radar processor.

4. The apparatus of claim 1, wherein the scheduler is configured to set the burst gap duration based on a rate to provide radar signal information from a memory of the radar device to a radar processor, wherein the radar signal information is based on received signals of the radar transmissions.

5. The apparatus of claim 1, wherein the scheduler is configured to determine the burst-based frame setting based on at least one radar performance parameter of the radar device.

6. The apparatus of claim 5, wherein the scheduler is configured to determine a first burst-based frame setting based on a first setting of the at least one radar performance parameter, and to determine a second burst-based frame setting based on a second setting of the at least one radar performance parameter, wherein the first setting of the at least one radar performance parameter is different from the second setting of the at least one radar performance parameter, and the first burst-based frame setting is different from the second burst-based frame setting.

7. The apparatus of claim 6, wherein the first burst-based frame setting comprises a first burst gap duration, and the second burst-based frame setting comprises a second burst gap duration different from the first burst gap duration.

8. The apparatus of claim 6, wherein the first setting of the at least one radar performance parameter comprises a first Signal to Noise Ratio (SNR), and the second setting of the at least one radar performance parameter comprises a second SNR greater than the first SNR, wherein the first burst-based frame setting comprises a first burst gap duration, and the second burst-based frame setting comprises a second burst gap duration longer than the first burst gap duration.

9. The apparatus of claim 6, wherein the first setting of the at least one radar performance parameter comprises a first range resolution level, and the second setting of the at least one radar performance parameter comprises a second range resolution level greater than the first range resolution level, wherein the first burst-based frame setting comprises a first burst gap duration, and the second burst-based frame setting comprises a second burst gap duration longer than the first burst gap duration.

10. The apparatus of claim 6, wherein the first setting of the at least one radar performance parameter comprises a first velocity resolution level, and the second setting of the at least one radar performance parameter comprises a second velocity resolution level greater than the first velocity resolution level, wherein the first burst-based frame setting comprises a first burst gap duration, and the second burst-based frame setting comprises a second burst gap duration longer than the first burst gap duration.

11. The apparatus of claim 6, wherein the first burst-based frame setting comprises a first value of a burst transmission count, and the second burst-based frame setting comprises a second value of the burst transmission count, the burst transmission count comprising a count of radar burst transmissions in the sequence of radar burst transmissions, wherein the second value of the burst transmission count is greater than the first value of the burst transmission count.

12. The apparatus of claim 1, wherein the burst-based frame setting comprises a setting of at least one of a burst transmission duration, a burst transmission bandwidth, or a burst transmission count, wherein the burst transmission duration comprises a duration of a radar burst transmission of the sequence of radar burst transmissions, wherein the burst transmission bandwidth comprises a frequency bandwidth of the radar burst transmission, wherein the burst transmission count comprises a count of radar burst transmissions in the sequence of radar burst transmissions.

13. The apparatus of claim 1, wherein the sequence of radar burst transmissions comprises a repetitive sequence of identical radar burst transmissions separated by a constant burst gap.

14. The apparatus of claim 1 comprising a controller configured to control the radar transmissions of the radar device according to the scheduling information, wherein the controller is configured to change one or more radar signal parameters between the first and second consecutive burst transmissions.

15. The apparatus of claim 1, wherein the output comprises transmission information to configure the radar transmissions according to the scheduling information.

16. The apparatus of claim 1 comprising a processor configured to generate radar information based on radar data, the radar data based on the radar transmissions.

17. A product comprising one or more tangible computer-readable non-transitory storage media comprising instructions operable to, when executed by at least one processor, cause a scheduler to:

determine scheduling information to schedule radar transmissions of a radar device during a sequence of radar frames, wherein determining the scheduling information comprises determining a burst-based frame setting to schedule a sequence of radar burst transmissions during a radar frame of the sequence of radar frames, the burst-based frame setting comprising a setting of a burst gap duration, the burst gap duration comprising a duration of a burst gap between first and second consecutive radar burst transmissions of the sequence of radar burst transmissions, wherein the burst gap is in a low-power state relative to a power state of the sequence of radar burst transmissions; and provide an output based on the scheduling information to cause the radar device to transmit the sequence of radar burst transmissions.

18. The product of claim 17, wherein the instructions, when executed, cause the scheduler to determine the burst-based frame setting based on at least one radar performance parameter of the radar device.

19. A vehicle comprising:

a system controller configured to control one or more vehicular systems of the vehicle based on radar information; and a radar system configured to generate the radar information, the radar system comprising:

a plurality of Transmit (Tx) antennas to transmit radar Tx signals;

a plurality of Receive (Rx) antennas to receive radar Rx signals based on the radar Tx signals;

a scheduler configured to determine scheduling information to schedule radar transmissions of the radar system during a sequence of radar frames, wherein the scheduler is configured to determine a burst-based frame setting to schedule a sequence of radar burst transmissions during a radar frame of the sequence of radar frames, the burst-based frame setting comprising a setting of a burst gap duration, the burst gap duration comprising a duration of a burst gap between first and second consecutive radar burst transmissions of the sequence of radar burst transmissions, wherein the burst gap is in a low-power state relative to a power state of the sequence of radar burst transmissions; and a processor configured to determine the radar information based on the radar Rx signals.

20. The vehicle of claim 19, wherein the scheduler is configured to determine the burst-based frame setting based on at least one radar performance parameter of the radar system.

* * * * *